US007488141B2

(12) United States Patent
Bivens et al.

(10) Patent No.: US 7,488,141 B2
(45) Date of Patent: Feb. 10, 2009

(54) AUTOMATED CONTROL METHODS FOR DRY BULK MATERIAL TRANSFER

(75) Inventors: Jason D. Bivens, Duncan, OK (US); John G. Heaton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 577 days.

(21) Appl. No.: 10/890,671

(22) Filed: Jul. 14, 2004

(65) Prior Publication Data

US 2006/0013061 A1 Jan. 19, 2006

(51) Int. Cl.
*B65G 53/04* (2006.01)

(52) U.S. Cl. .............................. 406/93; 406/94; 406/95

(58) Field of Classification Search ................... 406/93, 406/94, 95

See application file for complete search history.

(56) References Cited

U.S. PATENT DOCUMENTS

| | | | | |
|---|---|---|---|---|
| 2,771,323 | A | | 11/1956 | Taylor |
| 3,300,193 | A | | 1/1967 | Badgett |
| 3,938,673 | A | | 2/1976 | Perry, Jr. |
| 3,989,147 | A | | 11/1976 | Fried |
| 4,003,431 | A | * | 1/1977 | Novotny et al. ............. 166/293 |
| 4,116,491 | A | * | 9/1978 | Ply ............................. 406/89 |
| 4,151,983 | A | * | 5/1979 | Stock et al. ................ 294/66.2 |
| 4,220,426 | A | * | 9/1980 | Ply ............................. 406/89 |
| 4,289,428 | A | * | 9/1981 | Hiorns ........................ 406/39 |
| 4,390,371 | A | * | 6/1983 | Cornwell ..................... 106/644 |
| 4,395,166 | A | | 7/1983 | Ulveling |
| 4,413,932 | A | * | 11/1983 | Kobak ........................ 406/138 |
| 4,619,561 | A | * | 10/1986 | Perkins ........................ 406/89 |
| 4,662,799 | A | * | 5/1987 | Paul et al. ...................... 406/14 |
| 4,682,506 | A | | 7/1987 | Wienck et al. |
| 4,711,607 | A | * | 12/1987 | Wynosky et al. .............. 406/30 |
| 4,762,148 | A | * | 8/1988 | Marui et al. ................ 137/808 |
| 4,792,234 | A | | 12/1988 | Doherty |
| 4,858,477 | A | | 8/1989 | Wienck |
| 4,896,968 | A | | 1/1990 | Baillie |
| 4,898,208 | A | * | 2/1990 | Nelson .................... 137/614.2 |
| 5,018,868 | A | | 5/1991 | Baillie |
| 5,114,239 | A | * | 5/1992 | Allen ............................ 366/6 |

(Continued)

FOREIGN PATENT DOCUMENTS

DE 19 34 316 A1 1/1971

(Continued)

OTHER PUBLICATIONS

Foreign communication from related counter part application dated Sep. 21, 2005.

*Primary Examiner*—Douglas A Hess
(74) *Attorney, Agent, or Firm*—John W. Wustenberg; Conley Rose, P.C.

(57) ABSTRACT

A method for blending dry material in a plant comprises automatically controlling fluidization of the dry material, transfer of the material, or both. In various embodiments, the automatically controlling comprises optimizing an amount of time that the dry material is fluidized prior to transfer, optimizing the transfer rate of the dry material, detecting and eliminating a developing plug of the dry material, estimating the weight of the dry material in the transfer line, minimizing dribbling during transfer of the dry material, and combinations thereof.

47 Claims, 12 Drawing Sheets

U.S. PATENT DOCUMENTS

| | | | | |
|---|---|---|---|---|
| 5,174,320 | A | 12/1992 | Allen | |
| 5,252,007 | A * | 10/1993 | Klinzing et al. | 406/14 |
| 5,289,877 | A | 3/1994 | Naegele et al. | |
| 5,320,425 | A | 6/1994 | Stephenson et al. | |
| 5,538,286 | A | 7/1996 | Hoff | |
| 5,775,803 | A | 7/1998 | Montgomery et al. | |
| 6,609,871 | B2 * | 8/2003 | Pfeiffer et al. | 414/328 |
| 6,682,290 | B2 * | 1/2004 | Pfeiffer et al. | 414/328 |

FOREIGN PATENT DOCUMENTS

| | | | |
|---|---|---|---|
| EP | 0 386 637 | | 3/1990 |
| EP | 1 118 380 | A1 | 7/2001 |
| GB | 2 012 438 | A | 7/1979 |
| WO | WO 2004/058469 | A1 | 7/2004 |

* cited by examiner

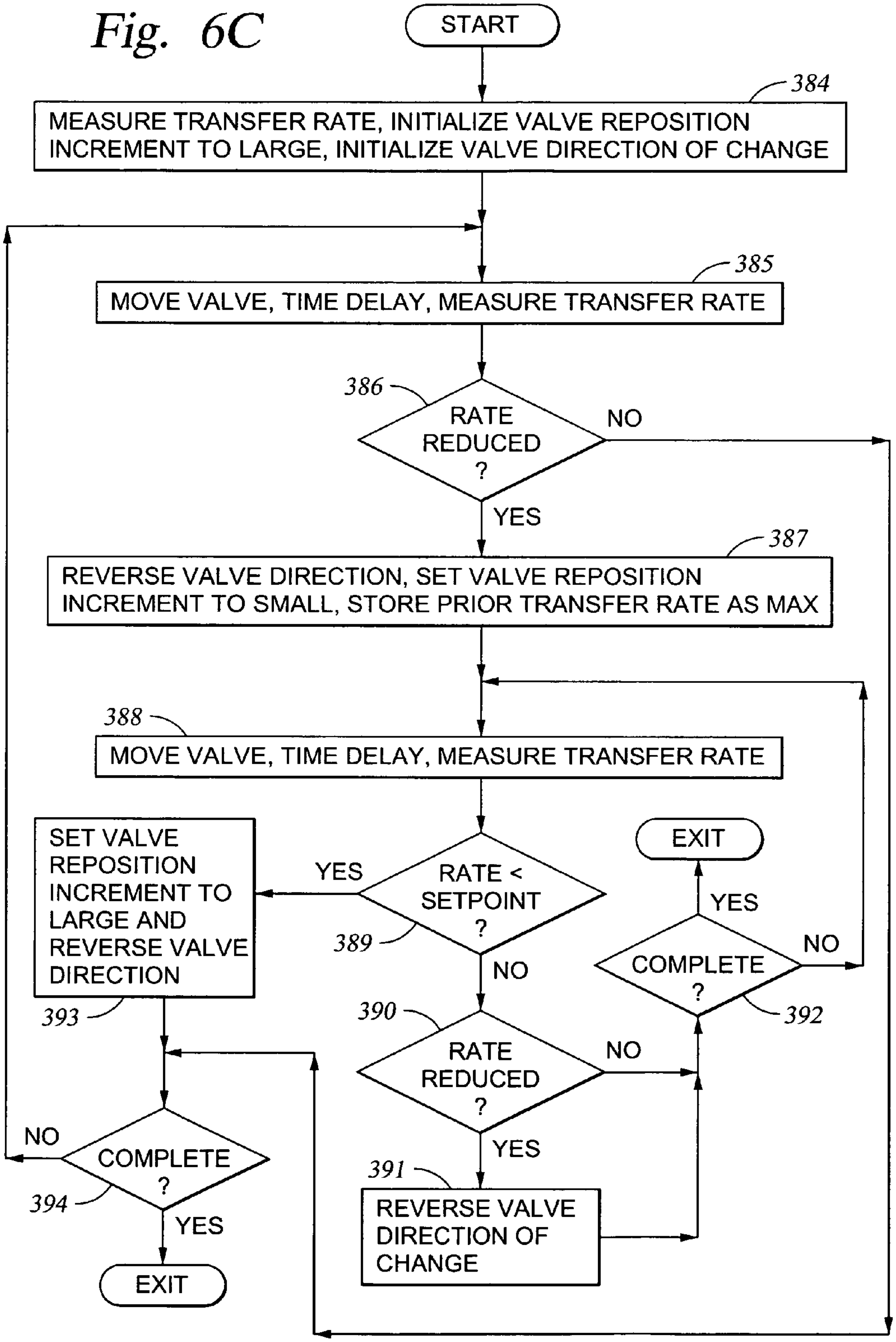
Fig. 6C
START
384
MEASURE TRANSFER RATE, INITIALIZE VALVE REPOSITION INCREMENT TO LARGE, INITIALIZE VALVE DIRECTION OF CHANGE
385
MOVE VALVE, TIME DELAY, MEASURE TRANSFER RATE
386
RATE REDUCED ?
NO
YES
387
REVERSE VALVE DIRECTION, SET VALVE REPOSITION INCREMENT TO SMALL, STORE PRIOR TRANSFER RATE AS MAX
388
MOVE VALVE, TIME DELAY, MEASURE TRANSFER RATE
SET VALVE REPOSITION INCREMENT TO LARGE AND REVERSE VALVE DIRECTION
YES
RATE < SETPOINT ?
389
EXIT
YES
NO
COMPLETE ?
392
393
NO
390
RATE REDUCED ?
NO
YES
NO
COMPLETE ?
394
YES
EXIT
391
REVERSE VALVE DIRECTION OF CHANGE

AUTOMATED CONTROL METHODS FOR DRY BULK MATERIAL TRANSFER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to automated control methods for transferring dry bulk materials. More particularly, but not by way of limitation, the present disclosure is directed to automated control methods for fluidizing dry bulk materials and efficiently transferring measured quantities of the dry bulk materials between tanks in a cement blending plant.

BACKGROUND OF THE INVENTION

Transferring dry bulk materials efficiently from one location to another in measured quantities is challenging. For efficiency purposes, it is desirable to transfer dry bulk materials rapidly, which may be promoted by fluidizing the materials using air (e.g. aerating) or another type of gas such as nitrogen, for example, prior to and during transfer. However, proper fluidization requires consideration of several factors. For example, recently fluidized materials do not benefit from adding more air or gas, and hence plant resources and time are wasted when such materials are unnecessarily fluidized. In addition, over-fluidization can degrade materials, for example, by introducing too much moisture. Further, the rapid transfer of materials can also create plugs in transfer lines between tanks, thereby reducing material transfer rates. Accordingly, proper fluidization to promote rapid material transfer requires customization based on the material type, how recently the material was fluidized, the characteristics of the transfer line, and other factors.

Transferring measured quantities of dry bulk materials is also challenging due to the difficulty in determining how much material is present within a transfer line at any point in time. In particular, dry bulk material may not be uniformly distributed within a fluidized stream, and therefore, it is difficult to predict exactly how much dry bulk material is contained within the transfer line. Therefore, to obtain a measured weight of dry bulk material within a scale tank, the inefficient process of "dribbling" is employed. Specifically, after most of the dry bulk material has been measured into the scale tank, incremental amounts of the material are moved from the storage tank into the transfer line and then purged into the scale tank. This process is repeated until the desired weight of material is achieved.

Thus, in practice, because several factors must be balanced to transfer dry bulk materials in measured quantities, a conventional cement plant is often manually operated by experienced personnel who transfer dry bulk materials based on intuition and judgment. However, optimum efficiency is still not achieved. Therefore, a need exists for automated control methods for efficiently transferring dry bulk materials in measured quantities.

SUMMARY OF THE INVENTION

Disclosed herein is a method for blending dry material in a plant, comprising automatically controlling fluidization of the dry material, transfer of the dry material, or both. In an embodiment, the automatically controlling comprises optimizing an amount of time that the dry material is fluidized prior to transfer. In an embodiment, the automatically controlling comprises optimizing the transfer rate of the dry material. In an embodiment, optimizing the transfer rate of the dry material comprises modulating a quantity of gas injected into the dry material during transfer. In an embodiment, the modulating comprises continually adjusting the quantity of gas injected. In an embodiment, when a maximum transfer rate of the dry material is obtained, the modulating ceases until the maximum transfer rate falls below a setpoint material transfer rate. In an embodiment, when the maximum transfer rate of the dry material is obtained, the modulating comprises finely adjusting the quantity of the gas injected. In an embodiment, the automatically controlling comprises detecting a developing plug of the dry material during transfer. In an embodiment, the detecting a developing plug comprises measuring an increase in a vacuum pressure and a decrease in a transfer rate of the dry material. In an embodiment, the automatically controlling comprises eliminating the developing plug. In an embodiment, the automatically controlling comprises eliminating the developing plug via modulating a quantity of gas injected into the dry material during transfer. In an embodiment, the automatically controlling comprises estimating the weight of the dry material in a transfer line. In an embodiment, the estimating comprises averaging a plurality of measured weights of the dry material in the transfer line over time. In an embodiment, the estimating comprises averaging a measured weight of the dry material in the transfer line with an expected weight of the dry material in the transfer line. In an embodiment, the automatically controlling comprises minimizing dribbling during transfer of the dry material. In an embodiment, the minimizing dribbling comprises limiting dribbling to transfer of a final portion of the dry material.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 6*c* is a flow chart of yet another embodiment of a method for modulating the pneumatic valve of FIG. 4 to maintain a maximum transfer rate of the dry bulk material.

DETAILED DESCRIPTION OF THE PREFERRED EMBODIMENTS

It should be understood at the outset that although embodiments of an automated control system for transferring dry bulk materials in a cement plant are described and illustrated below, the control system may be implemented in alternative environments and using any number of techniques, whether or not currently known or in existence. One of ordinary skill in the art will readily understand that the present disclosure is not limited to the drawings and techniques, nor to the design and implementation, illustrated and described herein.

Figure 1:
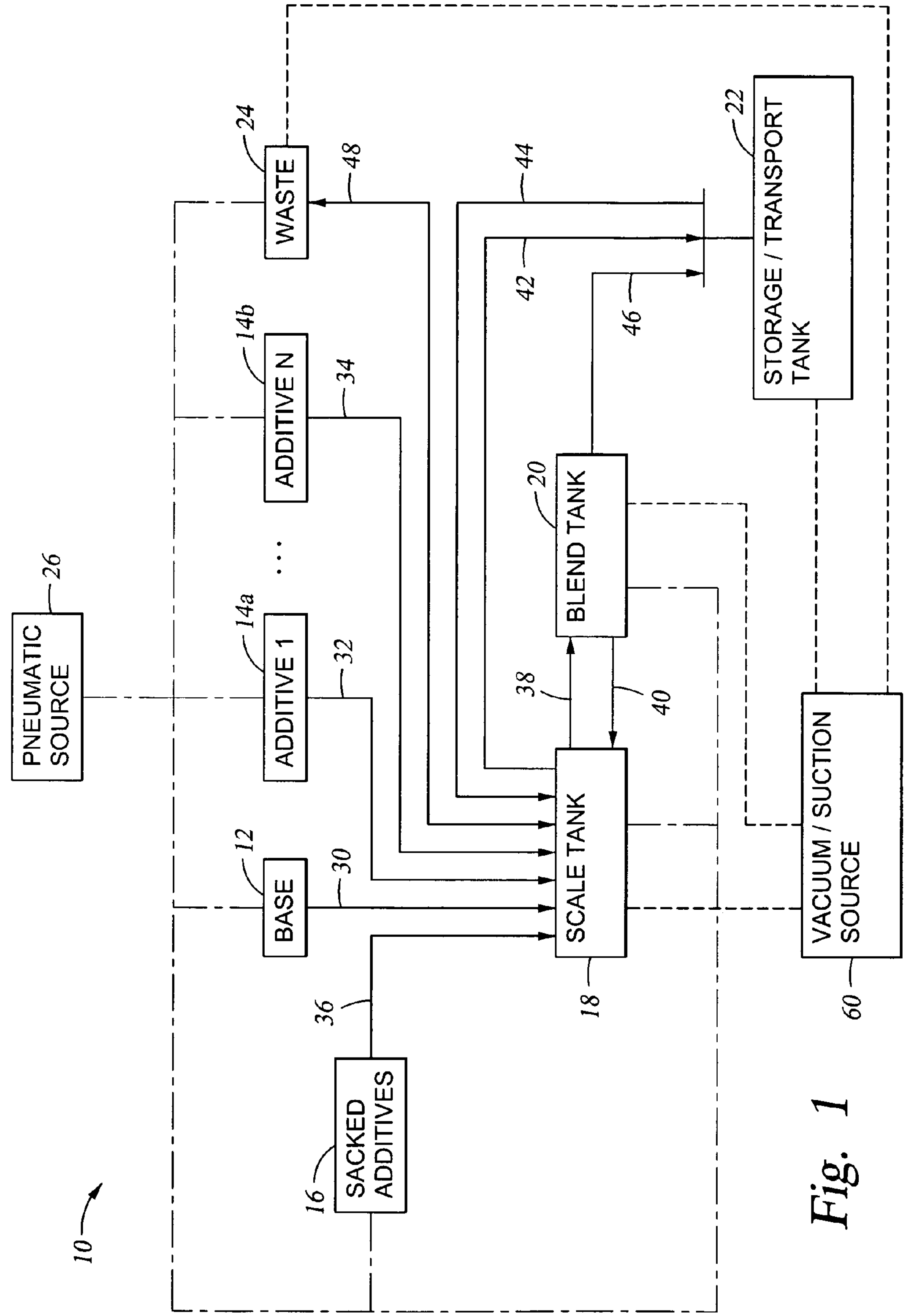
FIG. 1 is a schematic diagram of one embodiment of a cement blending plant.

FIG. 1 provides a schematic diagram of one embodiment of a system 10 for blending dry bulk materials for forming cement compositions, although it will be readily appreciated that other dry material compositions may be blended according to the present disclosure. As depicted in FIG. 1, the system 10 comprises one or more base material tanks 12; one or more additive tanks 14, namely, a first additive tank 14*a* and a second additive tank 14*b*; one or more sacked additive hoppers 16; one or more scale tanks 18, one or more blend tanks 20; one or more storage/transport tanks 22; one or more waste tanks 24; a pneumatic source 26 to fluidize the dry materials; and a vacuum/suction source 60 to transfer the dry materials between tanks. In an embodiment, the pneumatic source 26 is a positive displacement blower. In another embodiment, the pneumatic source 26 is a fan blower.

The various tanks 12, 14, 16, 18, 20, 22, 24; the pneumatic source 26; and the vacuum/suction source 60 are interconnected in fluid communication via transfer lines. In particular, as shown in FIG. 1, individual transfer lines may be provided between the tanks. Namely, transfer line 30 connects the base material tank 12 to the scale tank 18; transfer line 32 connects the first additive tank 14*a* to the scale tank 18; transfer line 34 connects the second additive tank 14*b* to the scale tank 18; transfer line 36 connects the sacked additive hopper 16 to the scale tank 18. Although FIG. 1 depicts the bulk tanks 12, 14 and the sacked additive hopper 16 feeding through individual transfer lines 30, 32, 34, 36 directly to the scale tank 18, in other embodiments, one or more of the bulk tanks 12, 14 and/or the sacked additive hopper 16 may connect to a manifold that feeds into a single transfer line to the scale tank 18.

Referring again to FIG. 1, transfer line 38 is provided to transfer material from the scale tank 18 to the blend tank 20, and transfer line 40 is provided to transfer material from the blend tank 20 to the scale tank 18. Alternately, a single bi-directional transfer line may replace the unidirectional transfer lines 38, 40. Transfer line 42 is provided to transfer material from the scale tank 18 to the storage/transport tank 22, and transfer line 44 is provided to transfer material from the storage/transport tank 22 to the scale tank 18. Alternately, a single bi-directional transfer line may replace the unidirectional transfer lines 42, 44. Transfer line 46 is provided to transfer material from the blend tank 20 to the storage/transport tank 22, and bidirectional transfer line 48 is provided to transfer material from the scale tank 18 to the waste tank 24 and vice-versa. Alternately, separate unidirectional transfer lines may replace bi-directional transfer line 48.

The base material tank 12 and the additive tanks 14 may be collectively referred to in some contexts herein as "bulk tanks," and the dry materials contained by the bulk tanks may be collectively referred to as "bulk materials." The base tank 12 may contain cement, for example, or another base material. The additive tanks 14 may contain sand, silica flour, bentonite, or salt, for example, or other additive materials. Typically, each additive tank 14 contains a single unblended additive material. The sacked additive hopper 16 is operable to receive smaller quantities of additives, such as 50 lb or 100 lb bags, for example. The number and size of bulk tanks 12, 14 and sacked additive hoppers 16 may be selected based upon the number and types of components to be blended.

The scale tank 18 is associated with a scale that measures the contents of the scale tank 18 as material is transferred from the bulk tanks or the sacked additive hopper 16. In an embodiment, the scale tank 18 employs an electronic scale. The scale tank 18 may also be employed to measure the weight of waste materials, such as, for example, leftover unused portions of a blend of bulk materials, before transferring the waste materials to the waste tank 24. In an embodiment each of the bulk tanks, for example the base material tank 12 and the additive material tanks 14, may employ an electronic scale which is used to measure the discharge of bulk material from the bulk tank.

To perform a material transfer via the system of FIG. 1, motive force for the flow of dry materials through the transfer lines may be provided by gravity; or by the vacuum/suction source 60 applying a vacuum at the material transfer destination tank; or by pneumatic pressure, for example pressurized air or another gas, such as nitrogen, for example, applied via the pneumatic source 26 at the material transfer origination tank and/or within the transfer lines; or by a combination of two more of the motive forces.

In more detail, pneumatic power, such as pressurized air or another gas, for example, may be supplied by the pneumatic source 26 to the bulk tanks for purposes of fluidizing the bulk materials in the base material tank 12 and the additive tanks 14 and/or providing positive pressure in such tanks prior to transferring the materials and during transfer of the materials to the scale tank 18. The pneumatic source 26 may also supply pneumatic power to the transfer lines for providing at least supplementary motive force to start the flow and/or aid in transferring the bulk materials and optionally one or more sacked additive materials to the scale tank 18. The pneumatic source 26 may also supply pneumatic power for purging the transfer lines when material flow from the base material tank 12, the additive tanks 14, and the sacked additive hopper 16 is stopped to clear the transfer line of the material.

In addition to the pneumatic power provided by the pneumatic source 26, vacuum or suction may be supplied by vacuum source 60 to create a pressure differential that induces a gas flow, such as an air flow, from the base material tank 12, the additive tanks 14, and/or the sacked additive hopper 16 to the scale tank 18, thus providing at least supplementary motive force to promote transfer of the bulk materials and the sacked additive materials. In an embodiment, the vacuum is applied at the destination tank, e.g., the scale tank 18, the blend tank 20, the storage/transport tank 22, the waste tank 24, or combinations thereof. The terms "vacuum" and "suction" refer to a pressure that is lower than an appropriate reference pressure, such as ambient atmospheric pressure. In an embodiment, one of the bulk tanks is non-pressurized and maintained at ambient atmospheric pressure. In an embodiment, the vacuum source 60 may be supplied by an air compressor, for example by connecting a vacuum line to the inlet of the air compressor.

In operation, bulk materials, and optionally sacked additive materials, are transferred to the scale tank 18 one at a time so that the incremental weight of each different material may be determined. Introduction of sacked additive materials may also be measured into the transfer line by weight using a separate small capacity scale, for example. In some embodiments, it may be desirable to achieve an accuracy of about plus or minus ten pounds when weighing materials for a blend.

In one example, a blend may weigh 50,000 pounds and may comprise, for example, 40,000 pounds of cement and 10,000 pounds of sand. A ⅓ portion of the total weight of cement may be transferred from the base material tank 12 to the scale tank 18, then a ½ portion of the total weight of sand may be transferred from an additive tank 14 to the scale tank 18, followed by the transfer of another ⅓ portion of the total weight of cement to the scale tank 18, then another ½ portion of the sand may be transferred to the scale tank 18, and finally the remaining ⅓ portion of the cement may be transferred to the scale tank 18. The weight of each of these portions may be calculated by the difference in the weight of the scale tank 18 before transferring the portion of the material and after transferring the portion of the material. Other blends may be produced, and these blends may be portioned into more layers and may comprise more than two bulk materials.

Layering the several materials according to the transfer operation described above promotes blending of the materials. To achieve an acceptably homogenous blend of base materials and additive materials, the materials may be repeatedly transferred from the scale tank 18 to the blend tank 20, and then from the blend tank 20 to the scale tank 18 several times. In an embodiment, the material is transferred at least four times to achieve an acceptably homogenous blend. In an embodiment, the system 10 may include additional blend tanks 20, and the succession of transfers to promote blending may take place between two or more blend tanks 20 rather than between the blend tank 20 and the scale tank 18. In an embodiment, transfers between two or more blend tanks 20 may occur at the same time that an independent blend is being transferred to the scale tank 18. In this case, multiple pneumatic sources 26 and multiple vacuum/suction sources 60 may be employed: one pneumatic source 26 and one vacuum/suction source 60 to promote transfer of the blend into the scale tank 18, and one pneumatic source 26 and one vacuum/suction source 60 to promote transfers between the two or more blend tanks 20.

Figure 2:
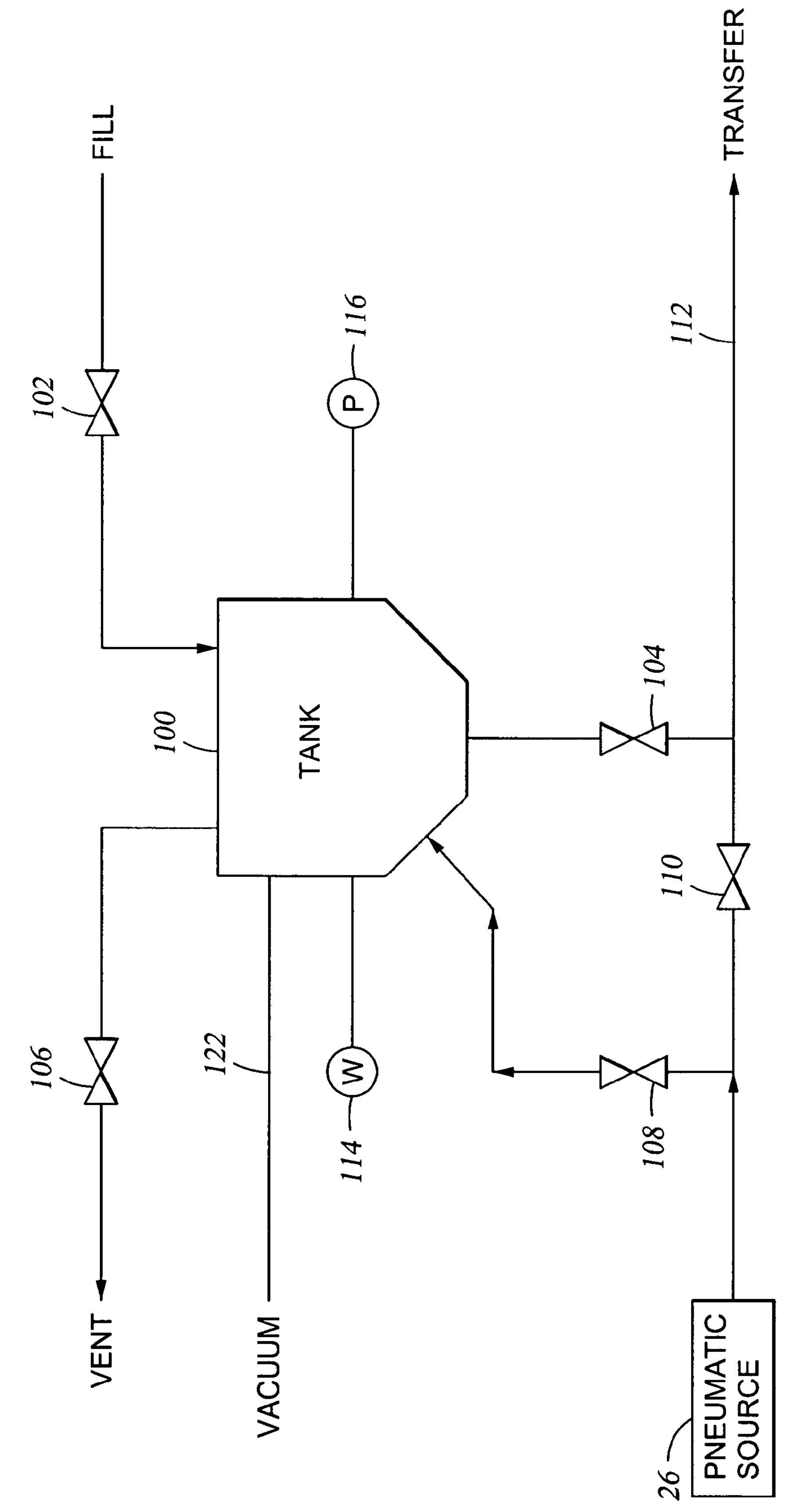
FIG. 2 is a schematic diagram of one embodiment of a representative tank showing valves and line connections.

Material transfer is controlled through the several transfer lines described above by opening and closing a plurality of valves in the network of transfer lines. Turning now to FIG. 2, a diagram of one embodiment of a tank 100 is depicted that represents any of the tanks 12, 14, 18, 20 or 24 in FIG. 1, for example. The representative tank 100 is associated with a fill valve 102, a discharge valve 104, a vent valve 106, an aeration valve 108, a pneumatic valve 110, and a transfer line 112. The base material tank 12, the additive tanks 14, the scale tank 18, the blend tank 20, and the waste tank 24 may each employ similar valves and transfer lines. The representative tank 100 is further associated with a weight transducer 114, a pressure transducer 116, and a vacuum line 122. In various embodiments, the vacuum line 122 may be associated with the scale tank 18, the blend tank 20, the storage/transport tank 22, the waste tank 24, or combinations thereof, to promote rapid transfer of material. The pressure transducer 116 may be associated with both the scale tank 18 and the blend tank 20. The weight transducer 114, which is also referred to as a scale, is associated with the scale tank 18.

The fill valve 102 may be opened to permit transfer of material into the tank 100 from a material source such as a truck or a railcar and may be closed to prevent transfer of material into the tank 100. The discharge valve 104 may be opened or closed to start or stop discharge of the material stored by the tank 100. The vent valve 106 may be opened to allow air to evacuate the tank 100 as material is introduced into the tank 100 through the fill valve 102, or to allow air to fill the tank 100 as material is discharged from the tank 100 through the discharge valve 104. The aeration valve 108 may be opened to permit air or another gas to be introduced into the tank 100 from the pneumatic source 26, for example, to fluidize or "fluff-up" the dry material stored in the tank 100 prior to and/or during material transfer. This process may be referred to as aerating the tank 100. The pneumatic valve 110, which may be referred to as a pneumatic control valve because it controls the delivery of pneumatic power from the pneumatic source 26, for example, may be opened to provide at least a portion of motive force to promote transfer of the material discharged from the tank 100 along the transfer line 112. The pneumatic valve 110 may also be opened to purge material from the transfer line 112 after discharge of material from the tank 100 is stopped.

Referring again to FIG. 1, to produce a blend of bulk compositions using the system 10 and the automated control system disclosed herein, a recipe for the blend is needed that defines the weight quantities of each material comprising the blend. The recipe will comprise a list of each material and the weight of each material. For example, a cement blend recipe may comprise 35,000 pounds (lbs) of cement material, 10,000 lbs of bentonite, and 5,000 lbs of salt for a total blend weight of 50,000 lbs.

To produce this particular cement blend, the cement may be transferred from the base material tank 12 to the scale tank 18 in approximately three 11,666.7 lbs portions, the bentonite may be transferred from the first additive tank **14*a* to the scale tank 18 in approximately two 5,000 lbs portions, and the salt may be transferred from the second additive tank 14*b* to the scale tank 18 in approximately two 2,500 lbs portions. To provide a layered composition in the scale tank 18, the first ⅓ portion of the cement is transferred first, the first ½ portion of the bentonite is transferred second, and the first ½ portion of the salt is transferred third. Then, the second ⅓ portion of the cement is transferred, followed by the remaining ½ portion of the bentonite, followed by the remaining ½ portion of the salt, and finally the remaining ⅓ portion of the cement. The layered composition may then be transferred between the scale tank 18 and the blend tank 20 a number of times, such as four transfers, for example, to produce a homogeneous blend. At this point, the cement composition has been blended according to the desired recipe, and the blended composition is ready to be transferred to the storage/transport tank 22 in a ready-to-use form. In one embodiment, for example, the storage/transport tank 22** may be a tank truck to transport the dry cement blend to a well bore location, where it will be mixed with water to produce cement slurry. The cement slurry may be pumped into the well bore to fill the annulus between a casing string and the well bore wall to cement the casing string in place.

When transferring materials to the scale tank 18, some bulk materials are more easily discharged from the bulk storage tanks, namely, the base material tank 12 and the additive tanks 14, if a given tank 12, 14 is first aerated to fluidize or fluff-up the material. In particular, the pneumatic source 26 is operated to blow a gas, such as air or nitrogen, into the tank 12, 14 and through the bulk material for a particular aeration time prior to discharging the material from the tank 12, 14 and transferring the material to the scale tank 18. The fluidization process is used to separate the particles of the material and make it flow more readily.

Referring to FIG. 2, aeration of a bulk material stored in the representative tank 100 may be accomplished by activating the pneumatic source 26, opening the vent valve 106, opening the aeration valve 108 for a specific time interval referred to as the aeration time, then closing the aeration valve 108, closing the vent valve 106, and deactivating the pneumatic source 26. After a tank 12, 14 has been aerated, the bulk materials may remain fluidized in the bulk storage tank for a period of time, which varies based on the type of material.

It is preferable to aerate for only the minimum amount of time required to fluidize the bulk materials because excessive aeration slows the transfer and blending process, consumes resources unnecessarily, and may also degrade the bulk materials by introducing moisture, for example. Some bulk materials should not be aerated at all, such as salt, while other bulk materials require varying aeration times depending upon the material type, the length of time since it was last aerated, and other factors. Therefore, in one embodiment, the automated control system comprises a method for determining the proper aeration time for each bulk material for a desired product blend.

Figure 3:
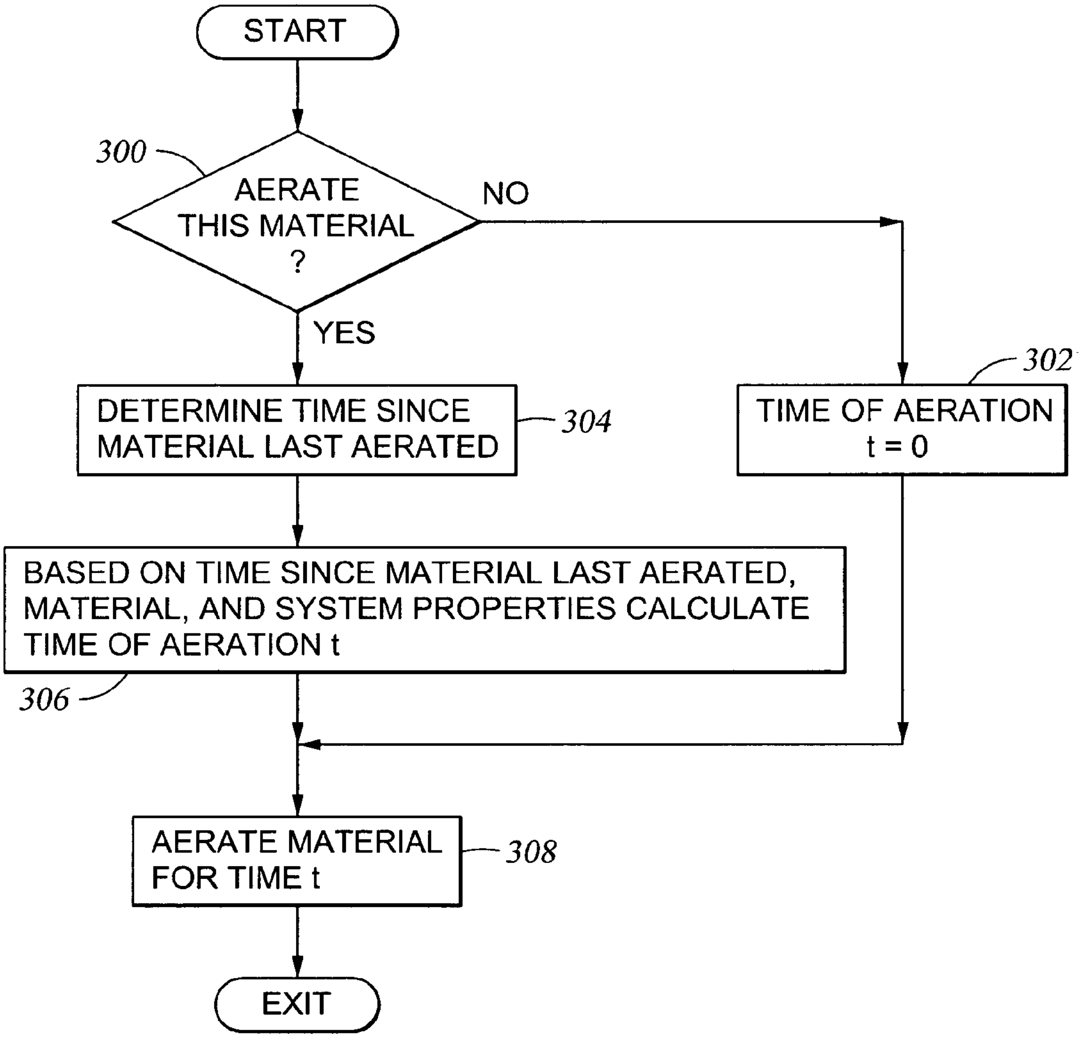
FIG. 3 is a flow chart of one embodiment of a method for determining the pre-transfer aeration time within a tank to fluidize a dry bulk material.

FIG. 3 depicts a flowchart for one embodiment of a method for determining the proper aeration time for dry bulk materials. The method may be embodied in a software program for control of bulk materials storage and blending plant operations. The software program is executed on a computerized control system as known to one skilled in the art. In block 300, a determination is made regarding whether the bulk material should be aerated because it is undesirable to aerate some materials, such as salt. If the material should not be aerated, the method proceeds to block 302 where the aeration time(t) is set to be 0 seconds, and the method proceeds to block 308 where the material is aerated for 0 seconds, (i.e. aeration is not conducted).

However, at block 300, if the material may be aerated, the method proceeds to block 304 where the length of time since the material was last aerated in that tank is determined. The method then proceeds to block 306 where the aeration time(t) is determined based on the length of time since the material was last aerated, the type of material, and properties of the system 10.

The properties of the system 10 which may be considered in determining aeration time for the bulk material include parameters associated with the tank 100, the transfer line 112, the gas supplied, and the bulk material. The parameters associated with the tank 100 may include the construction material; the diameter; the height; the discharge configuration such as the bottom cone angle, use of vibration, etc.; and the aeration inlet configuration of the tank 100. The parameters associated with the transfer line 112 may include the length of the transfer line 112, the diameter of the transfer line 112, and the construction material of the transfer line 112. The parameters associated with the gas supplied may include the type of gas, the gas flow rate, the maximum gas flow rate, the maximum gas pressure, the gas temperature, and the gas humidity. The parameters associated with the bulk material may include the angle of internal friction, the angle of repose, the angle of rupture, the angle of slide, the mean particle diameter, the particle size distribution, the particle density, the aerated density, the packed density, the in situ bulk density, the temperature, the surface moisture, and the time since last replenished.

Each time that a bulk material is scheduled to be discharged, such as, for example when a composition blend recipe has been entered into a blend control program, the software program determines the aeration time and controls the valves and pneumatic source 26 of the system 10 to cause the desired aeration to be provided to the bulk material in the tank. The software program monitors and records the amount of time since the material was replenished, as well as the amount of time since the bulk material in each bulk tank was last aerated. In addition, appropriate transducers associated with the bulk tanks provide the software program with data on a real-time, or near real-time basis, regarding the conditions of the bulk materials, such as, for example, the temperature and surface moisture of the material.

A variety of computer calculations may be employed to determine the aeration time for each subject material. In an embodiment, a look-up table for each material defining desirable aeration times at specific operating points may be employed wherein the software program linearly interpolates between the specified operating points to determine the aeration time.

In an embodiment, a software program implementing the flow chart of FIG. 3 provides a user interface, such as a set-up screen, for example, for modification of the rules that determine the aeration time for bulk materials. For example, the interface may permit a user to modify the rules governing whether a material may or may not be aerated, and to modify the aeration time for that material. In an embodiment, a user may define a plurality of "length of time since last aeration" setpoints and define a plurality of aeration times associated with each of those setpoints via the user interface or look-up/reference table provided by the software program. For example, assuming that a single setpoint of 2 hours since the material was last aerated and an aeration time of 4 minutes are defined for a certain material, such as bentonite, then if the material has been aerated within the last 2 hours, the calculated aeration time is 0 minutes. However, if the material was last aerated more than 2 hours ago, the calculated aeration time is 4 minutes. In another example, assume that two setpoints of 1 hour and 2 hours since the material was last aerated are defined, and associated with those setpoints are a first aeration time of 2 minutes, and a second aeration time of 5 minutes, respectively. Then, if the material, such as cement, was last aerated within 1 hour, the calculated aeration time is 0 minutes. If the material was last aerated more than 1 hour ago but less than 2 hours ago, the calculated aeration time is 2 minutes. If the material was last aerated more than 2 hours ago, the calculated aeration time is 5 minutes. Typically, there is an initial setpoint defining a minimum length of time since last aeration for the material (i.e., a minimum dormancy or resting time for the material) before the material will be aerated again, and a final setpoint defining a threshold length of time since last aeration for the material corresponding to a maximum aeration time for the material (i.e., at or beyond the final setpoint, the material will only be aerated for the maximum aeration time, which is selected based the on factors described herein). In an embodiment, the initial setpoint and the final setpoint are the same. In alternative embodiments, one or more additional setpoints and corresponding aeration times are defined between the initial and final setpoints, for example a plurality therebetween.

In an embodiment, a series of IF-ELSIF statements may be executed to determine whether the parameters fall within a range of values to select a specific aeration time. The following pseudocode is an example of how IF-ELSIF statements may be employed to determine aeration times.

```
switch (material) {
  case SALT:
      aerationTime = 0;
  case BENTONITE:
      if (lastBentoniteAerationTime < 2) {
          aerationTime = 0;
      } else {
          aerationTime = 2;
      }
  case CEMENT:
      if (lastCementAerationTime < 1) {
          aerationTime = 0;
      } elsif ((lastCementAerationTime >= 1) &&
          (lastCementAerationTime < 2)) {
          aerationTime = 2;
      } else {
          aerationTime = 5;
      }
}
```

In this pseudocode the "lastCementAerationTime" and "lastBentoniteAerationTime" variables are expressed in hour time units while the "aerationTime" variable is expressed in minute time units. The intended effect of the switch block of pseudocode is to select a block of instructions for execution based on whether the value of the material variable is SALT, BENTONITE, or CEMENT. This pseudocode is only exemplary and may not provide good programming form or error handling. The genericization of the pseudocode to permit restructuring, for example to add additional setpoints for a specific material, is within the capabilities of one of ordinary skill in the art.

As an alternative to using discrete setpoints and corresponding aeration times via initialization, user input, or a look-up table, the aeration time may be mathematically calculated from the length of time since last aeration, for example via curve fitting (e.g., linear) or other mathematical equations, which may further incorporate one or more of the previously listed properties of the system 10 that may be considered in determining aeration time.

Once the aeration time is determined, then the method proceeds to block 308 where the material is aerated for the aeration time determined in block 306.

Figure 4:
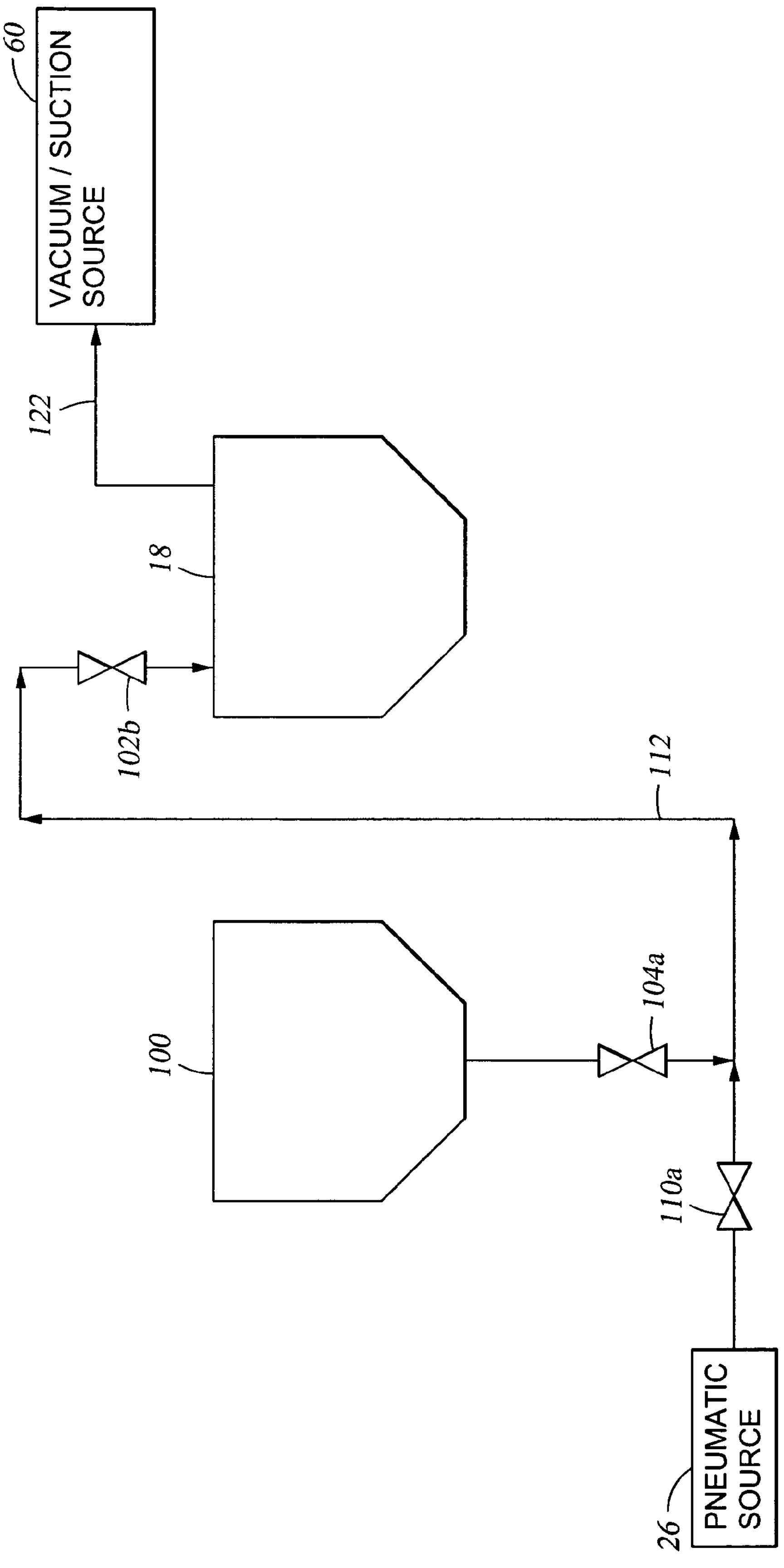
FIG. 4 is a schematic diagram of a representative dry bulk material storage tank as depicted in FIG. 2, connected by a transfer line to one embodiment of a scale tank for receiving and measuring dry bulk material.

FIG. 4 depicts a schematic diagram of the connections to provide transfer of a bulk material from the representative tank 100 to the scale tank 18. To begin the transfer of bulk material, the vacuum source 60 is activated, and a vacuum is applied to the scale tank 18 via the vacuum line 122. A first fill valve 102*b* of the scale tank 18 is opened, and a first discharge valve 104*a* of the representative tank 100 is opened. Depending upon the particular bulk material, pneumatic power (i.e. pressurized gas) may also be introduced into the transfer line via the pneumatic source 26 to start the bulk material flowing and/or provide supplementary motive force to the bulk material during the transfer operation. To provide the pneumatic power, the pneumatic source 26 is activated, and a first pneumatic valve 110*a* is at least partially opened to deliver gas into the transfer line 112.

Once transfer of the bulk material is complete, the first discharge valve 104*a* is closed, and the first pneumatic valve 110*a* is at least partially opened or maintained open to purge the transfer line 112. Then, the first pneumatic valve 110*a* is closed, the pneumatic source 26 is deactivated, the vacuum source 60 is deactivated, and the first fill valve 102*b* is closed.

During material transfer, it is desirable to regulate pneumatic power to achieve a maximum material transfer rate of the bulk material from the representative tank 100 to the scale tank 18. At the same time, it is undesirable to use excessive pneumatic power because this unnecessarily consumes resources and may degrade the bulk materials, such as by exposing the bulk materials to moisture. Therefore, in one embodiment, the automated control system comprises a method to regulate the pneumatic power applied to the transfer line 112 via the pneumatic valve 110*a* so as to achieve the optimum material transfer rate of the bulk material.

Figure 5:
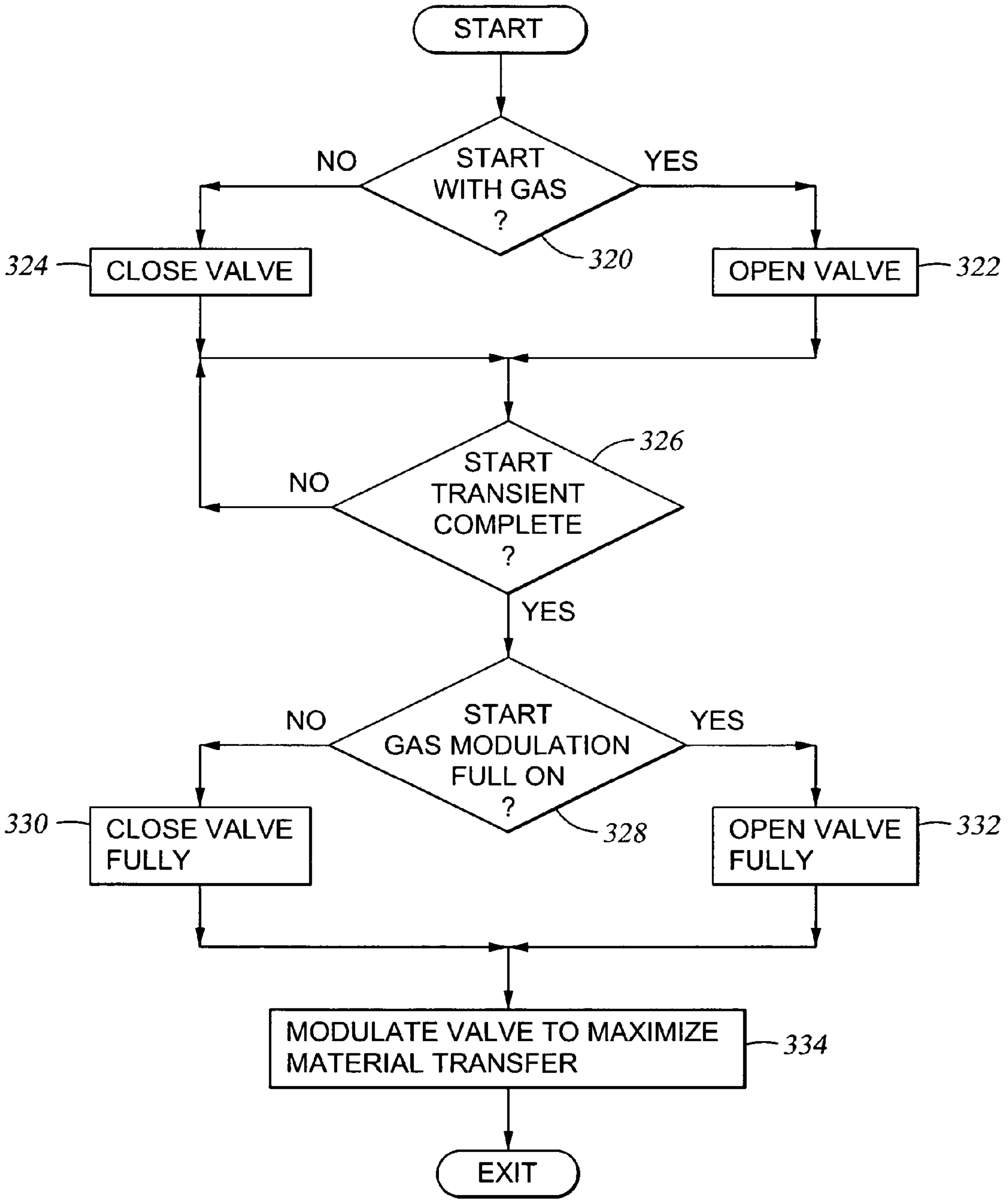
FIG. 5 is a flow chart of one embodiment of a method for controlling the pneumatic valve of FIG. 4 during the transfer of a dry bulk material from the storage tank to the scale tank.

FIG. 5 depicts a flow chart of one embodiment of a method for regulating pneumatic power delivery through pneumatic valve 110*a* to the transfer line 112 during bulk material transfer. The method may be embodied in a software program for control of bulk materials storage and blending plant operations. The software program is executed on a computerized control system as known to one skilled in the art. There are various approaches to applying pneumatic power to the transfer line 112 depending upon the material. For example, some materials will begin flowing into the transfer line 112 from the tank 100 via gravity without any pneumatic power, while others will not flow readily without pneumatic power. In block 320 if the material transfer starts with the application of pneumatic power, the method proceeds to block 322 where the first pneumatic valve 110*a* is opened to deliver pressurized gas from the pneumatic source 26 into the transfer line 112. Thereafter the discharge valve 104*a* is opened. If the material transfer starts without pneumatic power, the method proceeds to block 324 where the first pneumatic valve 110*a* is closed or is confirmed as closed. Thereafter the discharge valve 104*a* is opened. As previously stated, whether the material transfer starts with or without pneumatic power is determined by the kind of material being transferred. Upon appropriate positioning of discharge valve 104*a*, the method proceeds from block 322 or 324 to block 326 to determine whether the start transient is complete.

The start transient is a time delay to allow for the material to flow into the transfer line 112 and is defined as the time between when the discharge valve 104*a* is opened and when modulation of the pneumatic valve 110*a* is begun. The duration of the start transient may be set as a specific length of time after the discharge valve 104*a* is opened. The length of time may vary depending upon the material and may be configurable from a user interface provided by the software program. Alternately, the duration of the start transient may be determined by detecting that the material flow has reached the scale tank 18, such as by measuring a weight change in the scale tank 18. In block 326, the method determines whether the start transient is complete or not. If the start transient is not complete, the method loops back to block 326. However, if the start transient is complete, the method proceeds to block 328 for modulation of the pneumatic control valve 110*a* to maintain a maximum transfer rate.

As the material moves into the transfer line 112, the position of the pneumatic valve 110*a* is adjusted to determine the optimum amount of gas to inject into the transfer line 112 to maximize the material transfer rate. To locate the position of the first pneumatic valve 110*a* associated with the optimum gas delivery, the first pneumatic valve 110*a* is first fully opened or fully closed, depending upon the material. In block

328, a determination is made regarding whether the modulation starts with the first pneumatic valve 110*a* being fully open for the material being transferred, and if so, the method proceeds to block 332 where the first pneumatic valve 110*a* is fully opened. Otherwise, the method proceeds to block 330 where the first pneumatic valve 110*a* is fully closed. The method then proceeds to block 334 where the position of the first pneumatic valve 110*a* is modulated to deliver more or less gas and thereby maximize the material transfer rate of the material. When the material transfer is complete, the method exits.

Figure 6A:
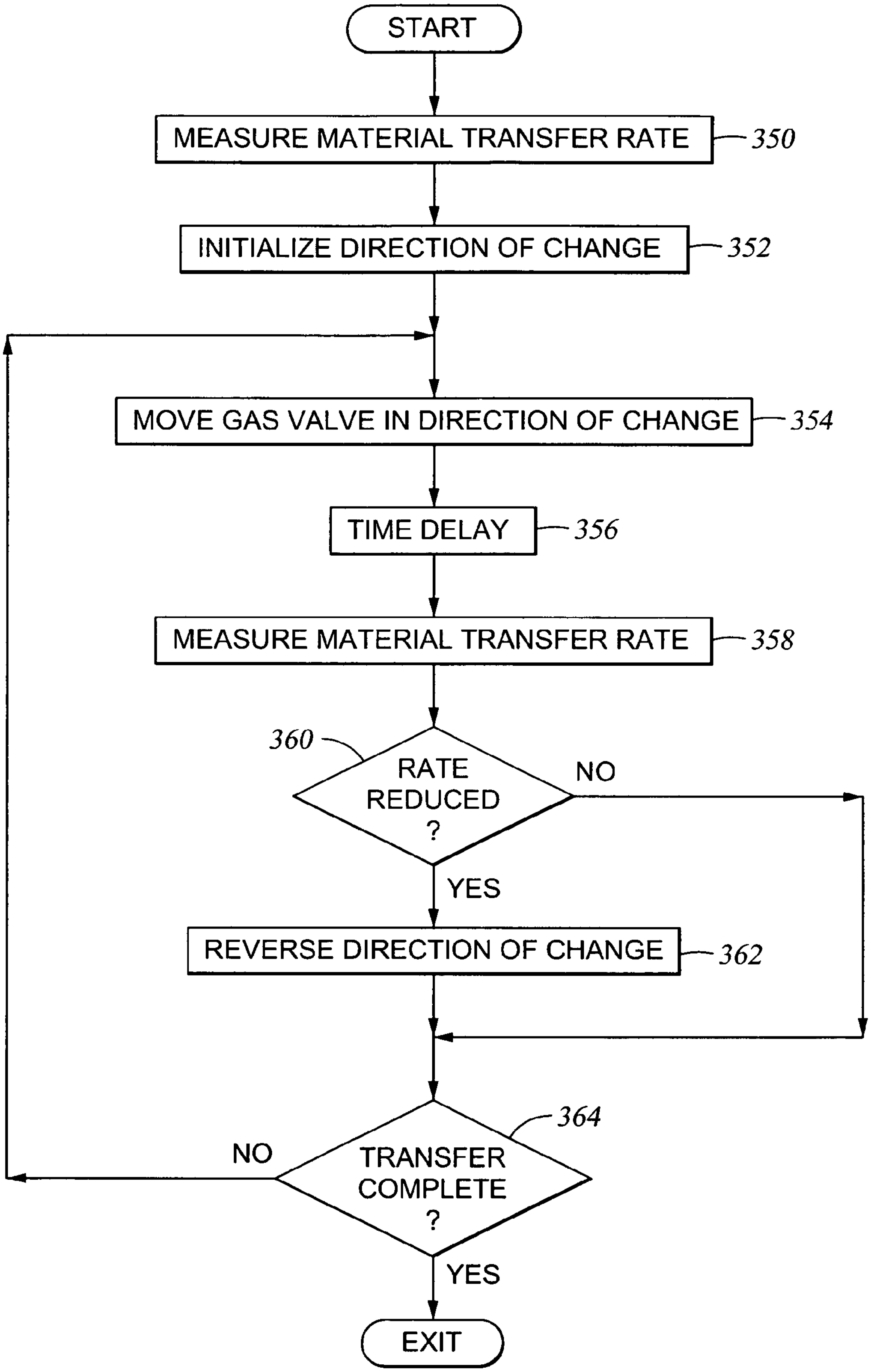
FIG. 6*a* is a flow chart of one embodiment of a method for modulating the pneumatic valve of FIG. 4 to maintain a maximum transfer rate of the dry bulk material.

Turning now to FIG. 6*a*, a flow chart is depicted, which provides further details regarding one embodiment of the modulation activity conducted in block 334 of FIG. 5. In block 350 the material transfer rate of the bulk material through the transfer line 112 is measured. This measurement may be performed by determining the weight of the scale tank 18 at a first point in time, determining the weight of the scale tank 18 at a second point in time, determining the difference in weight between the first and second times, and deriving a transfer rate from the quotient (weight change)/(time change). The method proceeds to block 352 where a direction of change of the first pneumatic valve 110*a* is initialized. If the first pneumatic valve 110*a* is fully closed at block 330 of FIG. 5, the direction of change is initialized to OPEN. If the first pneumatic valve 110*a* is fully opened at block 332 of FIG. 5, the direction of change is initialized to CLOSE. The method then proceeds to block 354 where the first pneumatic valve 110*a* is moved incrementally towards the open or closed position in the direction of change. In an embodiment, the increment of change of the position of the first pneumatic valve 110*a* is ⅛$^{th}$ of full travel, but in other embodiments, either finer or coarser increments of change may be employed.

Next, the method proceeds to block 356 where an appropriate time delay is employed to allow the effect of the preceding position change of the first pneumatic valve 110*a* to produce a related change in the material transfer rate. The appropriate time delay may vary with the material transfer rate, the material type, the length and diameter of the transfer line 112, the increment of change of the position of the first pneumatic valve 110*a*, the resolution of the weight transducer 114, and other factors. One skilled in the art will readily determine the appropriate time delay. For example, assuming a material transfer rate of about 5,000 lbs/minute and a weight of bulk material in the transfer line (also referred to as "line weight") of about 350 lbs, a single increment of change in the position of the first pneumatic valve 110*a* may produce a measurable change in the material transfer rate in about 5 seconds, which would suggest a time delay of greater than about 5 seconds, such as 6 seconds, for example. For other material transfer rates and other line weights, a different time delay may be required. In an embodiment, the time delay may be set to be slightly longer than the greatest lag between a change in position of the pneumatic valve 110*a* and a measurable change in the material transfer rate through any of the transfer lines 112 in the system 10.

The method then proceeds to block 358 where the material transfer rate of the bulk material through the transfer line 112 is measured. In block 360, a determination is made regarding whether the material transfer rate determined in block 358 decreased as compared to the material transfer rate determined in block 350, and if not, the method proceeds directly to block 364. Otherwise, if the material transfer rate determined in block 358 did decrease as compared to the material transfer rate determined in block 350, the method proceeds to block 362 where the direction of change in position of the pneumatic valve 110*a* is reversed. In particular, if the direction of change in the position of the pneumatic valve 110*a* was set to OPEN in block 352, the direction of change is set to CLOSE in block 362. However, if the direction of change in position of the pneumatic valve 110*a* was set to CLOSE in block 352, the direction of change is set to OPEN in block 362. The method then proceeds to block 364 to determine if the transfer of the bulk material is complete. If not, the method returns to block 354. Otherwise, when the material transfer is complete, the method exits.

By repeatedly performing the actions associated with blocks 354, 356, 358, 360, 362, and 364 the method continually repositions the first pneumatic valve 110*a* to maximize the material transfer rate of the bulk material by injecting more or less gas into the transfer line 112.

Figure 6B:
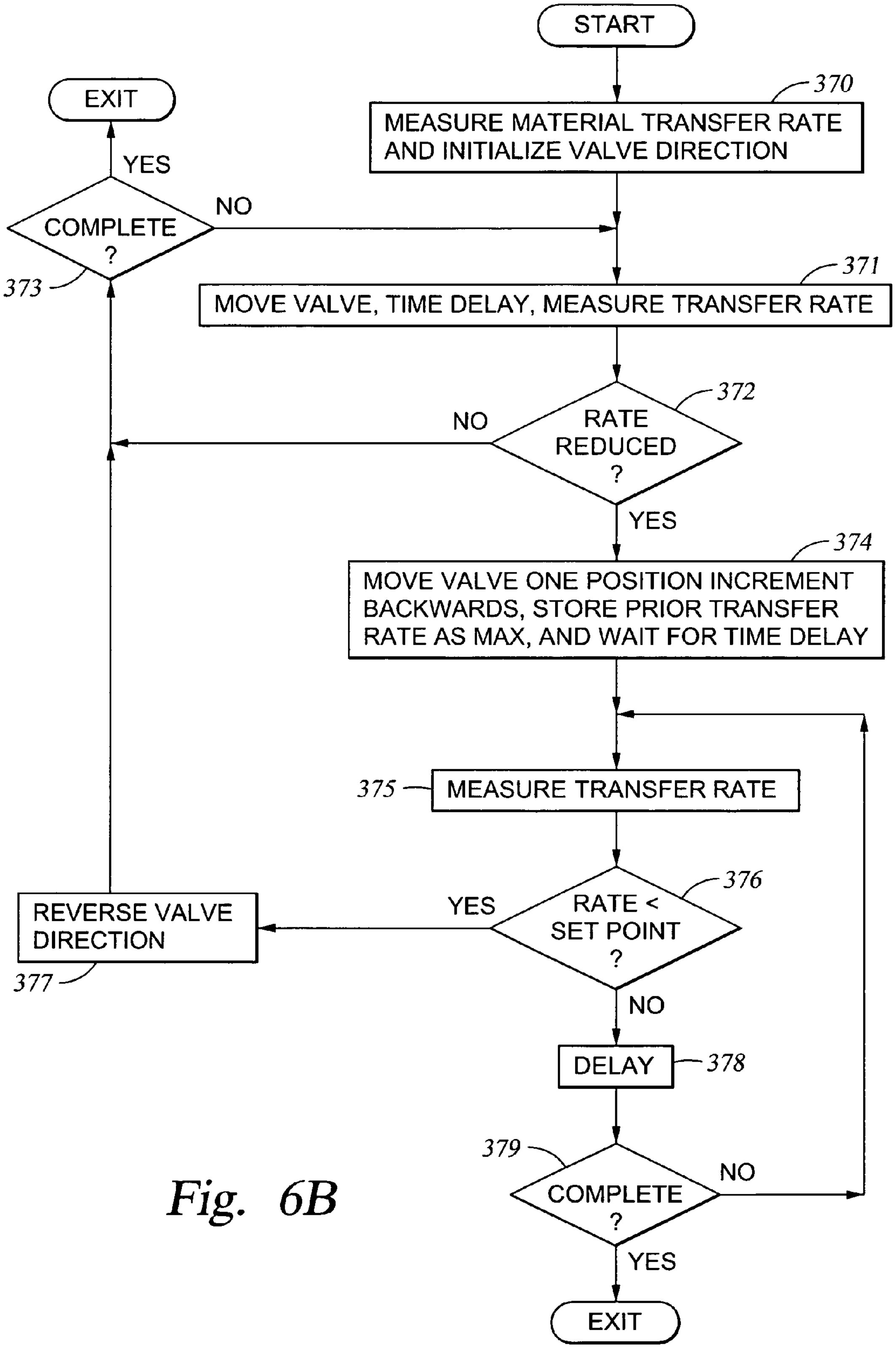
FIG. 6*b* is a flow chart of another embodiment of a method for modulating the pneumatic valve of FIG. 4 to maintain a maximum transfer rate of the dry bulk material.

Turning now to FIG. 6*b*, a flow chart is depicted regarding another embodiment of the modulation activity conducted in block 334 of FIG. 5. This modulation activity is related to the flow chart of FIG. 6*a*, but differs in that when the material transfer rate achieves a maximum, modulation of the pneumatic valve 110*a* stops, and the pneumatic valve 110*a* remains substantially statically positioned until the material transfer rate falls below a setpoint that is related to and less than the maximum material transfer rate, whereupon modulation resumes.

The method begins at step 370 where the material transfer rate of the bulk material through the transfer line 112 is measured and the direction of change of the pneumatic valve 110*a* is initialized as described with respect to FIG. 6*a* above in steps 350 and 352. The method proceeds to block 371 where the pneumatic valve 110*a* is moved incrementally towards the open or closed position, depending upon the direction of change of the pneumatic valve 110*a*, the method employs an appropriate time delay, and the material transfer rate is measured as described with respect to FIG. 6*a* above in steps 354, 356, and 358. The method then proceeds to block 372 where a determination is made regarding whether the transfer rate measured in block 371 decreased as compared to the transfer rate measured in block 370. If not, the method proceeds to block 373 to determine if the bulk material transfer is complete, and if so, the method exits. However, if the bulk material transfer is not complete, the method returns to block 371. By repeatedly performing the actions associated with blocks 371, 372, and 373 the pneumatic valve 110*a* is moved in one direction until the maximum material transfer rate is achieved and the material transfer rate drops below the maximum material transfer rate.

In block 372, if the material transfer rate measured in block 371 decreased as compared to the transfer rate measured in block 370, the method proceeds to block 374 where the pneumatic valve 110*a* is moved one position increment backwards. This is to return the valve 110*a* to the position in which the maximum material transfer rate was measured. In block 374 the prior measured material transfer rate is stored as the maximum material flow rate. Also, in block 374, an appropriate time delay is employed as described with respect to FIG. 6*a* in block 356. Then the method proceeds to block 375 where the material transfer rate is measured.

The method proceeds to block 376 where a determination is made regarding whether the material transfer rate measured in block 375 is less than a setpoint material transfer rate, and if so, the method proceeds to block 377. The setpoint material transfer rate is related to and less than the maximum material transfer rate. In an embodiment, the setpoint material transfer rate may be proportional to the maximum material transfer rate, for example the setpoint material transfer rate may be 80 percent of the maximum material transfer rate. In another embodiment, the setpoint material transfer rate may be determined by a different calculation. In block 377, the direction of change of the pneumatic valve 110*a* is reversed, and the method proceeds to block 373 to determine if the material transfer is complete. If not, the method returns to block 371 and modulation of the pneumatic valve 110*a* resumes.

However, in block 376 if the material transfer rate is equal to or greater than the setpoint material transfer rate, the method proceeds to block 378 where the method employs a time delay appropriate for quickly responding to a declining material transfer rate. In an embodiment, the time delay of block 378 may be completely eliminated, and the method may continually measure the material transfer rate and compare it to the setpoint material transfer rate. The method proceeds to block 379 to determine if the material transfer is complete, and if so, the method exits. Otherwise, the method proceeds to block 375. By looping through blocks 375, 376, 378, and 379 the method stops repositioning the pneumatic valve 110*a* and monitors the material transfer rate to ensure that it remains substantially at or near the maximum material transfer rate. In block 379, when the material transfer is complete the method exits.

Turning now to FIG. 6*c*, a flow chart is depicted regarding another embodiment of the modulation activity conducted in block 334 of FIG. 5. This modulation activity is related to that depicted in FIG. 6*a*, but differs in that when the material transfer rate achieves a maximum material transfer rate, the size of the increment of change in the position of the first pneumatic valve 110*a* with respect to FIG. 6*a* above in block 354 is reduced, permitting fine tuning of the position of the first pneumatic valve 110*a*. When the material transfer rate falls below a setpoint that is related to and less than the maximum material transfer rate, the coarse tuning increment of change in the position of the pneumatic valve 110*a* is restored.

The method begins at block 384 where the material transfer rate of the bulk material through the transfer line 112 is measured and the direction of change of the pneumatic valve 110*a* is initialized as described with respect to FIG. 6*a* above in steps 350 and 352. Also, in block 384, the valve reposition increment is set to a large increment. The method proceeds to block 385 where the pneumatic valve 110*a* is moved incrementally towards the open or closed position by an amount determined by the valve reposition increment, depending upon the direction of change of the pneumatic valve 110*a*. The method also employs an appropriate time delay, and the material transfer rate is measured as described above with respect to FIG. 6*a* in blocks 354, 356, and 358. The method then proceeds to block 386 where a determination is made regarding whether the material transfer rate measured in block 385 decreased as compared to the transfer rate measured in block 384, and if so, the method proceeds to block 387.

In block 387, the direction of change of the pneumatic valve 110*a* is reversed, the valve reposition increment is set to a small increment, and the next to the last measured material transfer rate is stored as the maximum material transfer rate. The method proceeds to block 388 where the pneumatic valve 110*a* is moved incrementally towards the open or closed position, depending upon the direction of change of the pneumatic valve 110*a*, and by an amount determined by the valve position increment. The method also employs an appropriate time delay, and the material transfer rate is measured as described above with respect to FIG. 6*a* in blocks 356 and 358.

The method proceeds to block 389 where a determination is made regarding whether the material transfer rate is equal to or greater than a setpoint material transfer rate, and if so, the method proceeds to block 390. In an embodiment, the setpoint material transfer rate may be proportional to the maximum material transfer rate, for example the setpoint material transfer rate may be 80 percent of the maximum material transfer rate. In another embodiment, the setpoint material transfer rate may be determined by a different calculation. In block 390, a determination is made regarding whether the transfer rate measured in block 388 decreased as compared to the transfer rate measured in block 385, and if so, the method proceeds to block 391 where the direction of change of the pneumatic valve 110*a* is reversed, and the method proceeds to block 392. Otherwise, in block 390, if the material transfer rate did not decrease, the method proceeds directly to block 392. In block 392, a determination is made regarding whether the material transfer is complete, and if so, the method exits. Otherwise, the method returns to block 388. By looping through blocks 388, 389, 390, 391, and 392 the method modulates the pneumatic valve 110*a* continuously using small increments. The small increments permit finer tuning of the position of the pneumatic valve 110*a*.

In block 389, if the material transfer rate is less than the setpoint material transfer rate, the method proceeds to block 393 where the valve reposition increment is set to the large increment and the direction of change of the pneumatic valve 110*a* is reversed. The method then proceeds to block 394 where a determination is made regarding whether the material transfer is complete, and if so, the process exits. Otherwise, the process returns to block 385. By looping through blocks 385, 386, 387, 388, 389, 393, and 394 the method modulates the position of the pneumatic valve 110*a* using large increments, and when a maximum material transfer rate is achieved, the process returns to the fine tuning modulation of blocks 390, 391, 392, 388, and 389.

During transfer of bulk material, the transfer line 112 may become blocked or plugged by the bulk material. Generally, this condition is identifiable based on a concurrent increase in the vacuum pressure of the scale tank 18 and a decrease in the material transfer rate of the bulk material. Therefore, in one embodiment, the automated control system comprises a method to detect the onset of a plug in the transfer line 112 and to take corrective action.

Figure 7:
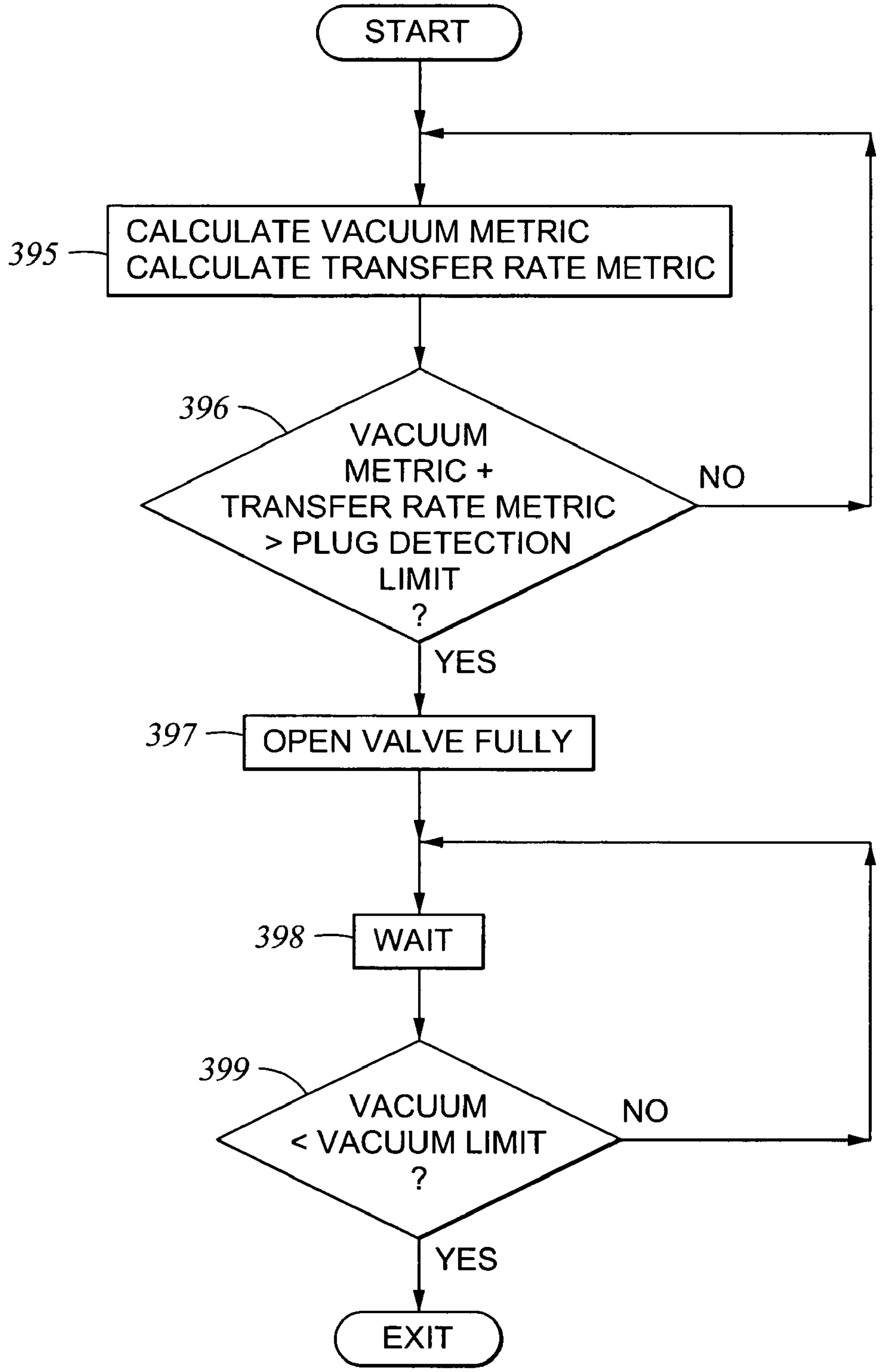
FIG. 7 is a flow chart of one embodiment of a method for detecting and removing a material plug in a transfer line by controlling the pneumatic valve of FIG. 4.

In particular, FIG. 7 depicts a flow chart of one embodiment of a method for detecting and removing a plug in the transfer line 112. In block 395, a vacuum metric is calculated as the product of a first coefficient times the difference between the vacuum pressure in the scale tank 18 and a vacuum limit, represented as VacuumMetric=$C_1$*(VacuumPressure−VacuumLimit). The vacuum pressure is the absolute value of the difference between the pressure measured in the scale tank 18 and a reference pressure, such as atmospheric pressure, or the pressure at the first pneumatic valve 110*a*. Also in block 395, a transfer rate metric is calculated as the product of a second coefficient times the difference between a transfer rate limit and the measured material transfer rate, represented as TransferRateMetric=$C_2$*(TransferRateLimit−TransferRate).

Some dry bulk materials exhibit substantial variability in their transfer rates during normal transfer, as for example a material that clumps together to move as slugs through the transfer line 112. For such material transfers, it may be useful to employ a sliding window average of the material transfer rate rather than an instantaneous material transfer rate when calculating the transfer rate metric. A sliding window average is an average calculated over the last several data points, for example, the average of the present material transfer rate and the previous four material transfer rates. The appropriate first coefficient and second coefficient in block 395 and the appropriate plug detection limit in block 396 will be readily determined by one skilled in the art.

In block 396, if the sum of the vacuum metric and the transfer rate metric exceeds a plug detection limit, the method proceeds to block 397. The plug detection limit may be exceeded if the vacuum pressure increases and/or the material transfer rate decreases, for example, thereby indicating that a plug may be developing in the transfer line 112. At block 397, the first pneumatic valve 110*a* is fully opened. This causes the gas flow, such as pneumatic air flow, to increase in the transfer line 112, thereby blowing out the plug of bulk material and restoring normal bulk material flow. The method proceeds to block 398 where the method waits an appropriate period of time to allow the vacuum pressure in the scale tank 18 to decrease. One skilled in the art will readily determine the appropriate period of time to wait in block 398. The method then proceeds to block 399 where, if the vacuum pressure has decreased below the Vacuum Limit, the method exits, but if the vacuum pressure has not decreased below the Vacuum Limit, the method returns to block 398 and waits again.

In an embodiment, after the method of FIG. 7 exits, the modulation method of FIG. 6*a*, FIG. 6*b*, or FIG. 6*c* resumes control of the first pneumatic valve 110*a*.

When producing a blended composition of dry bulk materials, each portion is typically measured out carefully into the scale tank 18, such as the first ⅓ portion of cement weighing 11,666.7 lbs described in the example above. During a transfer operation for a single material, some of the bulk material remains in the transfer line 112 after the discharge valve 104 is closed. This residual bulk material in the transfer line 112 must be transferred to the scale tank 18, since generally the bulk materials cannot be left in the transfer line 112. To ensure that the weight of a single portion of material does not exceed the desired weight, the transfer of bulk material into the scale tank 18 is stopped before the target weight is achieved. Then, the pneumatic valve 110*a* is opened to flow gas into the transfer line 112 to purge the material into the scale tank 18, and the incremental weight of the portion of bulk material is examined to determine if the desired portion weight has been achieved. If not, the first discharge valve 104*a* is opened briefly, such as for one second, for example. Then the bulk material in the transfer line 112 is purged again, and the incremental weight of the portion of bulk material is examined. This process is repeated until the weight of the portion of bulk material in the scale tank 18 is correct. This process may be termed "dribbling" or "tip toeing" up to the target weight of the portion of bulk material.

The dribbling process, however, is time consuming. Therefore, in one embodiment, the automated control system comprises a method for estimating the weight of dry bulk material in the transfer line 112 to determine when to close the first discharge valve 104*a* and purge the transfer line 112 to obtain the desired portion weight in the scale tank 18. For example, if the cement remaining in the transfer line 112 on average weighs 350 lbs, then to achieve the target portion weight of 11,666.7 lbs, the first discharge valve 104*a* may be closed when the incremental weight of the portion in the scale tank 18 reaches 11,316.7 lbs. Then, when the transfer line 112 is purged to move the 350 lbs of remaining cement to the scale tank 18, the weight of the cement portion increases to the target weight of 11,666.7 lbs.

The weight of bulk material in the transfer line 112, however, varies with the type material, length and diameter of the line, quantity of the transfer gas used, and other factors. Therefore, in one embodiment, the automated control system comprises a method for estimating the weight of the bulk material remaining in the transfer line 112 after the first discharge valve 104*a* is closed. Using this method, nearly the exact desired weight of the portion of bulk material may be transferred without dribbling. Alternately, the target weight may be set for just slightly less than the desired portion weight, then the method may be employed to transfer the target weight, and minimal dribbling may be employed to achieve the desired weight of the portion of bulk material.

Figure 8:
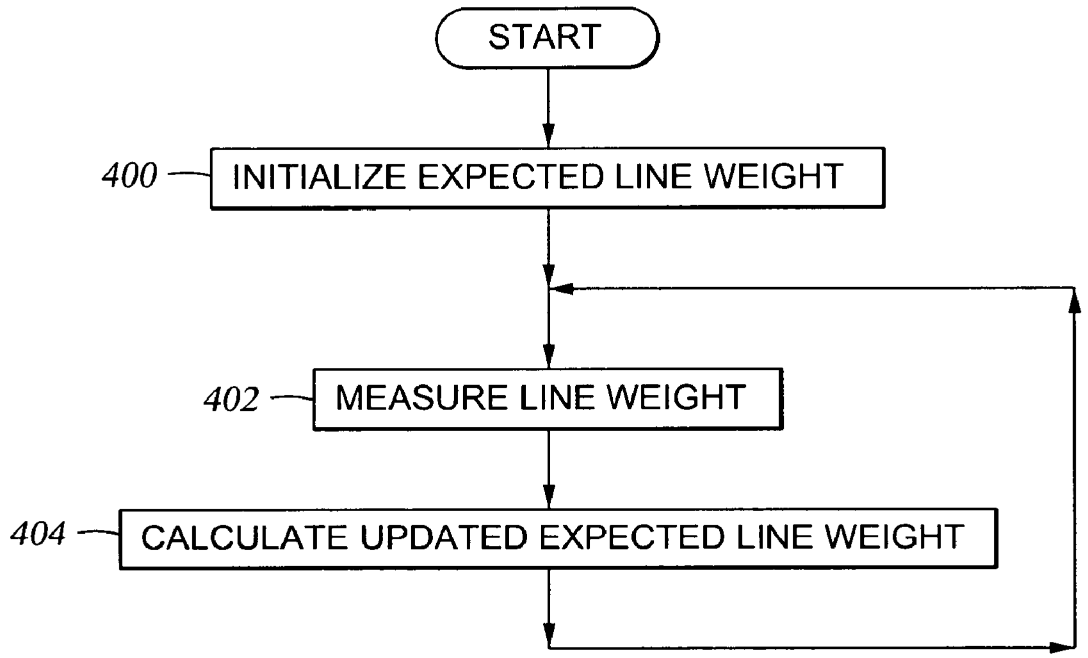
FIG. 8 is a flow chart of one embodiment of a method for estimating the weight of a dry bulk material present within a transfer line.

FIG. 8 depicts a flow chart of one embodiment of a method for determining the weight of a bulk material remaining in the transfer line 112 after the first discharge valve 104*a* is closed. This method, parameterized by the type of bulk material, may be employed for every different portion of bulk material that may be blended by the system 10. The method may be embodied in a software program for control of bulk materials storage and blending plant operations. The software program is executed on a computerized control system as known to one skilled in the art.

In block 400 an expected line weight for the subject bulk material is provided an initial value. This initial value may be coded into the software program or may be read from a file when bringing up the software program in new plants or when introducing new bulk materials into an existing bulk plant. The line weight of a material may depend upon the density of the material, the length and diameter of the transfer line between the subject bulk tank and the scale tank 18, the transfer characteristics of the subject bulk material, and other factors. The initial value of the expected line weight may be determined by a blend plant designer or a blend plant installation technician who is skilled in the art and may estimate an appropriate initial value for the expected line weight by means other than that described above. In general, the initial expected line weight should be greater than a maximum anticipated line weight, since underestimating the expected line weight may lead to transferring too much of the subject bulk material on the first several transfer operations. One way of determining the initial value of the expected line weight is to multiply a known density of the subject bulk material by a known volume of the transfer line 112 multiplied by 1.5, which provides some margin of error. As the method repeats over and over again, the software program compares the expected line weight to the actual line weight and adjusts the expected line weight accordingly. In this way, the estimated weight of the bulk material in the transfer line 112 converges on the actual weight of the bulk material in the transfer line 112.

The method proceeds to block 402 where a line weight of the subject material is measured. In particular, the first discharge valve 104*a* is opened and a material is transferred to the scale tank 18. Then the first discharge valve 104*a* is closed, and a first weight of the scale tank 18 is determined. Then the pneumatic valve 110*a* is opened, and after an appropriate time period that allows the bulk material in the transfer line 112 to be transferred into the scale tank 18 (i.e. material purge time), a second weight of the scale tank 18 is determined. The material purge time may depend upon the subject bulk material, the length and diameter of the transfer line 112, and other factors. The software program may read the material purge time from a configuration file to facilitate adjusting the material purge time based on experience gained in the field when bringing a new bulk plant into service or when introducing a new bulk material into the bulk plant operation. The material purge time may be determined in the field by observing the time period from the closing of the discharge valve 104*a* to weight stabilization of the scale tank 18. This procedure may be repeated several times to confirm any variation of range in the material purge time. The material purge time may also be determined by selecting the maximum observed purge time and multiplying the maximum observed purge time by 1.5 to provide a margin of error. Alternately, the material purge time may be determined by a blend plant designer or a blend plant installation technician who is skilled in the art.

In block 402, the line weight is determined as the difference between the first and the second weights of the scale tank 18. The method proceeds to block 404 where an updated expected line weight is calculated as the average of the measured line weight and the prior expected line weight. To accomplish this averaging, a count of averaging events and the sum of line weights may be retained in the memory of the software program.

In an alternative embodiment, the updated expected line weight step of block 404 may be the average of a plurality of the last several measured line weights, for example the last five line weights. This may be termed a sliding window average.

As previously mentioned, the process of dribbling the bulk material to achieve a desired portion weight is time consuming. Therefore, in one embodiment, the automated control system comprises a method of blending a composition of bulk materials to reduce the number of times the dribbling process is employed.

Figure 9A:
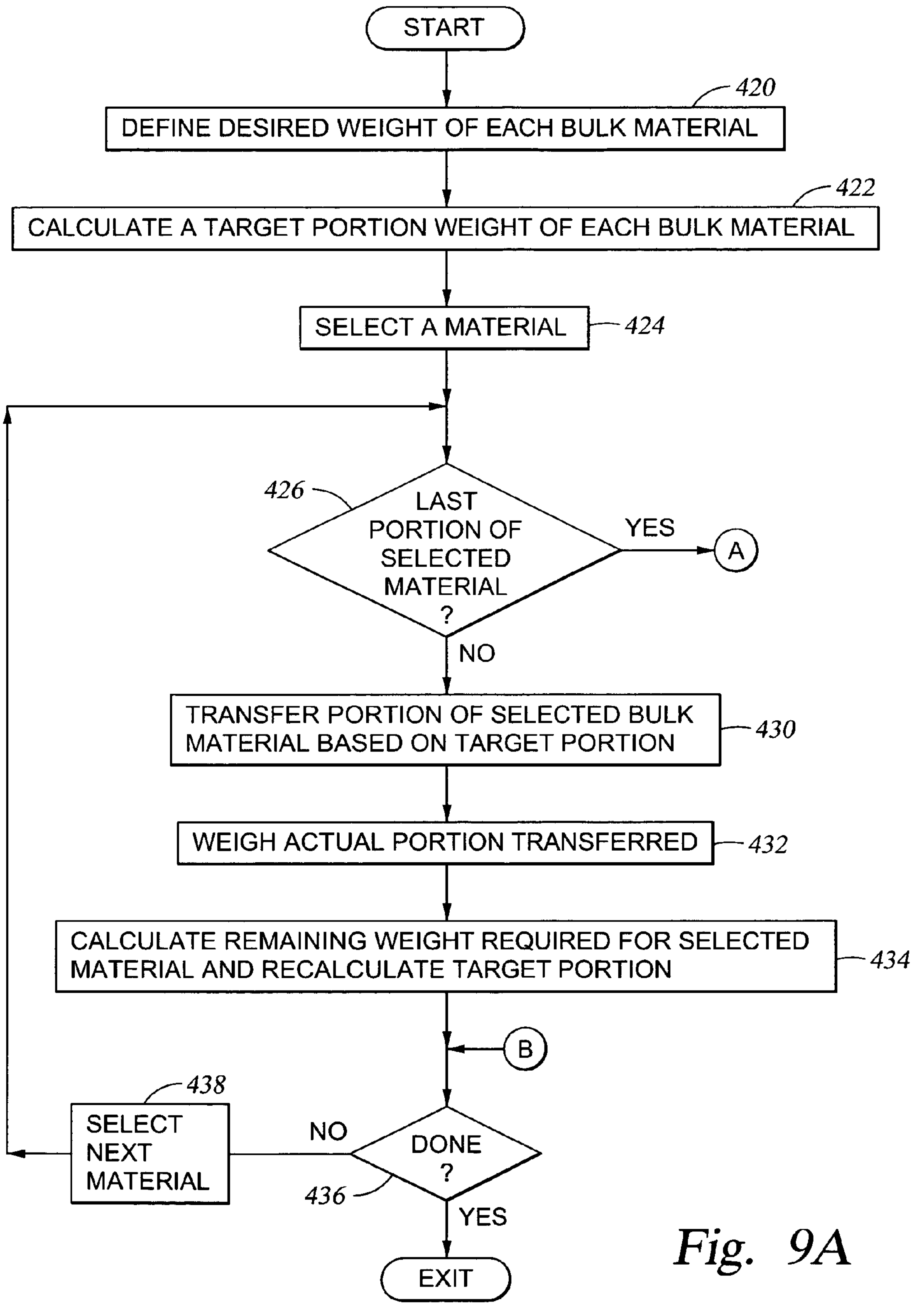
FIGS. 9*a* and 9*b* are complementary portions of a flow chart of one embodiment of a method for reducing the overall time associated with blending a composition of dry bulk materials.
Figure 9B:
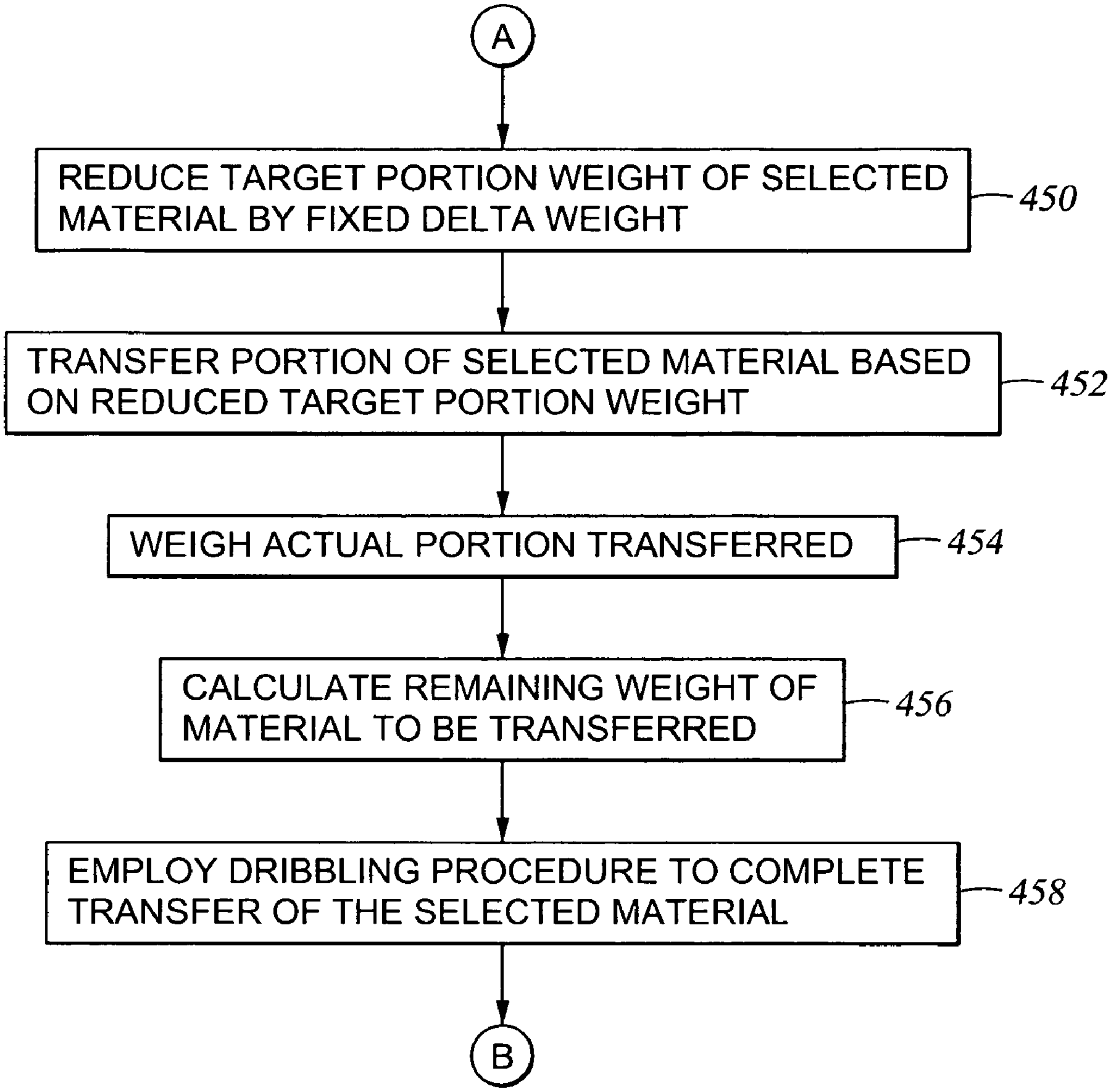

In particular, FIGS. 9*a* and 9*b* depict a flow chart of one embodiment of a method for reducing the number of times the dribbling process is employed. The method may be embodied in a software program for control of bulk materials storage and blending plant operations. The software program is executed on a computerized control system known to one skilled in the art. Referring to FIG. 9*a*, in block 420, the overall desired weight of each bulk material is defined, for example 35,000 lbs of cement material, 10,000 lbs of bentonite, and 5,000 lbs of salt. The method proceeds to block 422 where a target portion weight of each bulk material is calculated. The target portion weight depends upon the layering scheme to be employed. Assuming three layers of cement and two layers each of bentonite and of salt, the target portion weights in the above example may be 11,666.7 lbs of cement material, 5,000 lbs of bentonite, and 2,500 lbs of salt. The method then proceeds to block 424 where a material is selected. In the present example, wherein three layers of cement material and two layers each of the additive materials bentonite and salt are to be transferred, the cement material is selected to be transferred first.

The method proceeds to block 426 where a determination is made regarding whether this portion is the last portion of this material to be transferred. If so, the method proceeds to block A. Processing associated with block A is depicted in FIG. 9*b*. When processing associated with block A is completed, this path of the method proceeds to block 436 from block B. In block 426, if the subject portion is not the last portion of the selected material to be transferred, the method proceeds to block 430 where the portion of the selected material is transferred to achieve the target weight previously determined. Before being transferred, the selected dry bulk material in the tank may be aerated via the method described above with respect to FIG. 3, for example. During the transfer, the selected bulk material may be transferred using the method for regulating pneumatic power during bulk material transfer as described above with respect to FIGS. 5 and 6*a*, 6*b*, or 6*c*, and the method for detecting and removing a plug from the transfer line 112 as described above with respect to FIG. 7. Additionally, the portion may be transferred employing the method for determining the weight of bulk material remaining in the transfer line 112 as described above with respect to FIG. 8 so as to close the first discharge valve 104*a* at the appropriate time.

The method of FIG. 9*a* proceeds to block 432 where the weight of the portion of bulk material actually transferred in block 430 is weighed in the scale tank 18. In practice, there may be some error in the conveyance of precise weights of bulk material. Some materials lend themselves to predictable, repeatable transfer behavior, and other materials do not. For example, the weight of the first portion of cement transferred to the scale tank 18 after purging the transfer line 112 may be 11,635 lbs rather than the target of 11,666.7 lbs.

The method of FIG. 9*a* proceeds to block 434 where the weight of the selected material remaining to be transferred is calculated and the target portion weight of the selected material is recalculated. For example, if a total weight of 35,000 lbs of cement is desired and 11,635 lbs was transferred in the first portion, then 23,365 lbs of cement remains to be transferred in two equal target portions. Each target portion is then equal to half of 23,365 lbs or 11,682.5 lbs. The method proceeds to block 436 where if all of the bulk materials have been transferred the method exits, otherwise the method proceeds to block 438.

In block 438, the next material to be transferred is selected. In the example outlined above, after the first portion of cement is transferred, one of the additive materials, such as bentonite, is transferred, and then the remaining additive material, salt, is transferred. For each material, the method loops through blocks 426, 430, 432, 434, 436, and 438 until the last portion or layer of each bulk material is to be transferred.

Returning again to block 426 of FIG. 9*a*, if the last portion of the selected bulk material is to be transferred, the method proceeds to block A. Turning now to FIG. 9*b*, a flow chart depicts the portion of the method for transferring the last portion of the subject bulk material. In block 450, the target portion of the selected bulk material is reduced by a fixed delta weight associated with the specific selected bulk material. This allows for some error to prevent transfer of too much of the last portion of the selected material. In practice, the delta weight for a material may be determined as a "dribble amount", that is the weight of material added to the scale tank 18 by briefly opening and closing the discharge valve 104 for a given amount of time, for example for one second, and purging the transfer line 112. In an embodiment the delta weight for a material may be configured using a user interface provided by the software program. The total weight of the selected bulk material may then be brought up to the precise target weight for the selected bulk material using the dribbling process. In an embodiment the delta weight may be automatically calculated by the software program using the material transfer rate. For example, if the material transfer rate is 5,000 lbs/minute, one second of material discharge may deliver approximately 83 lbs of the subject material which would be a suitable delta weight to employ in the method of FIG. 9*b*.

The method proceeds to block 452 where the portion of the selected material is transferred to achieve the reduced target weight determined in block 450. During the transfer, the selected bulk material may be transferred using the method for regulating pneumatic power during bulk material transfer as described above with respect to FIGS. 5 and 6*a*, 6*b*, or 6*c*, and the method for detecting and removing a plug from the transfer line 112 as described above with respect to FIG. 7. Additionally, the portion may be transferred employing the method for determining the weight of bulk material remaining in the transfer line 112 as described above with respect to FIG. 8 so as to close the first discharge valve 104*a* at the appropriate time.

The method of FIG. 9*b* proceeds to block 454 where the weight of the portion of bulk material actually transferred in block 452 is weighed in the scale tank 18. The method proceeds to block 456 where the weight of the selected material actually transferred is compared to the reduced target weight, and the remaining weight to be transferred is calculated. The remaining weight of material to be transferred is expected to be small, and should approach the delta weight previously described. The method proceeds to block 458 where the manual dribbling procedure is employed to complete the transfer of the complete full target weight of the bulk material to the scale tank 18. The method then proceeds to block B to rejoin the flow chart depicted in FIG. 9*a* at block 436.

The method of FIGS. 9*a* and 9*b* minimizes the number of times that the dribbling process is employed. Additionally, this method may obviate the need to employ dribbling for one or more specific bulk materials. In this case, a refinement of the method may be to selectively bypass block 426 and to proceed directly to block 430 for bulk materials that experience shows exhibit predictable, repeatable transfer behaviors and hence need not complete transfer by using the dribbling process.

The above described methods for controlling dry bulk materials storage and blend plant operations are inter-related and may be employed in a single software program or a plurality of software programs commonly managed by a supervisory computer system. Various optimizations of the several automated control methods may thereby be obtained by cooperation among the methods which otherwise may not be readily achievable.

Several examples of the methods disclosed herein are described below.

EXAMPLES

Example 1

In this example, dry materials in a blend plant are transferred using automated control methods. The automated control methods provide for fluidizing the dry materials, and optionally injecting a gas into the dry materials prior to transfer and/or during transfer. During transfer of a dry material, the automated control method may detect and remove a developing plug of the dry material by injecting the gas into the dry material. The automated control method may further transfer measured quantities of one or more different dry materials, and may estimate the weight of each dry material in a transfer line.

Example 2

In this example, an automated control method fluidizes dry material in a blend plant system by injecting gas into the dry material. The automated control method may also comprise determining the duration of gas injection into the dry materials prior to transfer by determining the type of dry material, determining the amount of time since the gas was last injected into the dry material, optionally determining one or more properties of the blend plant system, and determining the duration of gas injection into the dry material prior to transfer based on the type of dry material, the amount of time since the gas was last injected into the dry material, and optionally the one or more properties of the blend plant system. The one or more properties of the blend plant system may comprise properties associated with a tank that stores the dry material, a transfer line for transferring the dry material, the gas injected, the dry material, or combinations thereof. The properties associated with the tank may comprise the construction material, the diameter, the height, the discharge configuration, the gas inlet, or combinations thereof. The properties associated with the transfer line may comprise the length, the diameter, the construction material, and combinations thereof. The properties associated with the gas injected may comprise the type of gas, the flow rate, the maximum flow rate, the maximum pressure, the temperature, the humidity, and combinations thereof. The properties associated with the dry material may comprise the angle of internal friction, the angle of repose, the angle of rupture, the angle of slide, the mean particle diameter, the particle size distribution, the particle density, the fluidized density, the packed density, the in situ bulk density, the temperature, the surface moisture, the time since last replenished, and combinations thereof. The duration of gas injection prior to transfer may be determined: (1) using a look-up table; (2) from user input; or (3) using computer code, as for example using a mathematical equation. The automated control method further comprises injecting the gas into the dry material for the determined duration prior to transfer.

Example 3

In this example, an automated control method fluidizes a dry material in a blend plant system by injecting gas into the dry material during transfer. The automated control method may also comprise modulating the quantity of gas injection into the dry material during transfer to obtain a maximum transfer rate of the dry material.

Example 3a

In this special case of example 3, the modulation comprises continually adjusting the quantity of gas injection. The modulation may comprise: (1) initially maximizing or minimizing the gas injection based upon the type of dry material, (2) setting a direction of change of the gas injection to decrease the gas injection is initially maximized or to increase if the gas injection is initially minimized, (3) measuring a first transfer rate of the dry material through a transfer line, (4) increasing the gas injection or decreasing the gas injection according to the direction of change, (5) employing a time delay sufficient to detect a change in the first transfer rate, (6) measuring a second transfer rate of the dry material, and (7) comparing the second transfer rate to the first transfer rate until the second transfer rate is less than the first transfer rate or the transfer is complete. When the second transfer rate is less than the first transfer rate, the method may further comprise reversing the direction of change of the gas injection and repeating steps (1) through (7) above, not necessarily in the order presented, until the second transfer rate is again less than the first transfer rate, or the transfer is complete.

Example 3b

In this special case of example 3, the modulation may cease when a maximum transfer rate is achieved and not resume until the transfer rate falls below a setpoint material transfer rate. The modulation may comprise: (1) initially maximizing or minimizing the gas injection based upon the type of dry material, (2) setting a direction of change of the gas injection to decrease if the gas injection is initially maximized or to increase if the gas injection is initially minimized, (3) measuring a first transfer rate of the dry material through a transfer line, (4) increasing the gas injection or decreasing the gas injection according to the direction of change, (5) employing a time delay sufficient to detect a change in the first transfer rate, (6) measuring a second transfer rate of the dry material, and (7) comparing the second transfer rate to the first transfer rate until the second transfer rate is less than the first transfer rate or the transfer is complete. When the second transfer rate is less than the first transfer rate, the method may further comprise reversing the direction of change of the gas injection, increasing or decreasing the gas injection by one increment based on the direction of change, storing the first transfer rate as the maximum transfer rate, and modulation may then end. The method may thereafter include employing a time delay, monitoring an actual transfer rate of the dry material as compared to the setpoint material transfer rate until the actual transfer rate falls below the setpoint material transfer rate or the transfer is complete. If the actual transfer rate falls below the setpoint material transfer rate modulation resumes, the method further comprises reversing the direction of change of the gas injection, increasing or decreasing the gas injection based on the direction of change, and repeating steps (1) through (7) above, not necessarily in the order presented, until the second transfer rate is less than the first transfer rate or until the transfer is complete.

Example 3c

In this special case of example 3, when the maximum transfer rate of the dry material is obtained, modulating may comprise adjusting the quantity of the gas injection in small increments. The modulation may comprise: (1) initially maximizing or minimizing the gas injection based upon the type of dry material, (2) setting a direction of change of the gas injection to decrease if the gas injection is initially maximized or to increase if the gas injection is initially minimized, (3) setting an increment of change of the gas injection to large and wherein increasing the gas injection or decreasing the gas injection is performed according to the increment of change, (4) measuring a first transfer rate of the dry material through a transfer line, (5) increasing the gas injection or decreasing the gas injection according to the direction of change, (6) employing a time delay sufficient to detect a change in the first transfer rate, (7) measuring a second transfer rate of the dry material, and (8) comparing the second transfer rate to the first transfer rate until the second transfer rate is less than the first transfer rate or the transfer is complete. When the second transfer rate is less than the first transfer rate, the method may further comprise reversing the direction of change of the gas injection, resetting the increment of change of the gas injection to small, storing the first transfer rate as the maximum transfer rate, increasing or decreasing the gas injection according to the direction of change and the increment of change, employing a time delay, and monitoring an actual transfer rate of the dry material as compared to a setpoint material transfer rate. If the actual transfer rate of the dry material falls below the setpoint material transfer rate, the method may further comprise resetting the increment of change of the gas injection to large, reversing the direction of change of the gas injection, and repeating steps (1) through (8) above, not necessarily in the order presented, until the transfer is complete.

Example 4

In this example, an automated control method comprises detecting and removing a developing plug of a dry material during transfer. The automated control method comprises establishing a vacuum limit for a vacuum pressure in a tank receiving the dry material during transfer, establishing a transfer rate limit for a transfer rate of the dry material, monitoring the vacuum pressure and the transfer rate of the dry material, calculating a vacuum metric based on the vacuum limit and the actual vacuum pressure, calculating a transfer rate metric based on the transfer rate limit and the actual transfer rate of the dry material, detecting the development of a plug when the sum of the vacuum metric and the transfer rate metric exceed a plug detection limit, and injecting a gas into the dry material sufficient to remove the developing plug. The actual transfer rate may be an instantaneous transfer rate or a sliding window average calculated using several instantaneous rates over time. The method may further comprise determining that the developing plug has been removed by confirming that the vacuum pressure falls below the vacuum limit.

Example 5

In this example, an automated control method estimates the weight of the dry material in a transfer line in a bulk plant system. The automated control method comprises providing an initial expected line weight of dry material in a transfer line, transferring a portion of the dry material through the transfer line into a tank, measuring a first weight of the dry material within the tank, purging the remaining portion of the dry material out of the transfer line and into the tank, measuring a second weight of the dry material within the tank, calculating an actual line weight of the dry material in the transfer line based on the difference between the first weight and the second weight, and calculating an updated expected line weight of dry material in the transfer line. The updated expected line weight is based on the average of the initial expected line weight and the actual line weight or on the average of a plurality of several actual line weights.

Example 6

In this example, an automated control method transfers measured quantities of at least two different dry materials in a bulk plant system. The automated control method comprises determining an overall desired weight for each dry material based upon a blend recipe, determining a number of portions (N) for each dry material based upon how the dry materials will be layered into a receiving tank, determining a target portion weight for each dry material based on the number of portions (N) and the overall desired weight, transferring N−1 portions of each dry material to the receiving tank comprising (a) transferring a portion of each dry material based on the target portion weight, (b) weighing the portions of each dry material in the receiving tank, (c) calculating the remaining weight of each dry material based on the difference between the overall desired weight and the weights of the portions of each dry material already transferred to the receiving tank, (d) recalculating the target portion weight for the remaining N−1 portions of each dry material based on the remaining weight, and (e) repeating steps (a) through (d). The method further comprises determining a reduced target portion weight for the last portion of each dry material based on the difference between the target portion weight and a fixed delta weight, transferring the last portion of each dry material based on the reduced target portion weight, weighing each last portion of each dry material in the receiving tank, calculating the final remaining weight of each dry material based on the difference between the overall desired weight and the weights of the portions of each dry material already transferred to the receiving tank, and dribbling the final remaining weight of each dry material into the receiving tank.

Example 7

In this example, an automated control method for transferring dry materials in a blend plant comprises monitoring at least one parameter of a first dry material, optionally fluidizing the first dry material based on the at least one parameter, determining a first portion target weight of the first dry material based on a total target weight of the first dry material, modulating a delivery of pneumatic power to transfer the first dry material at a maximum transfer rate, increasing the pneumatic power to remove a plug of the first dry material while transferring the first dry material, estimating the weight of the first dry material in a transfer line while transferring the first dry material, using the estimated weight of the first dry material in the transfer line and a measured weight of the first dry material transferred into a second tank to stop the dispensing of the first dry material from a first tank, and determining a target weight of a second portion of the first dry material based on the difference between the total target weight of the first dry material and the measured weight of the first portion of the first dry material transferred into the second tank.

The method may further comprise transferring a first portion of a second dry material from a third tank into the second tank, transferring the second portion of the first dry material from the first tank to the second tank based on the target weight of the second portion of the first dry material, determining a target weight of a third portion of the first dry material based on the difference between the total weight of the first dry material and the measured weight of the first and second portions of the first dry material transferred to the second tank, transferring a second portion of the second dry material from the third tank to the second tank, and transferring the third portion of the first dry material from the first tank to the second tank based on the target weight of the third portion of the first dry material.

Example 8

In this example, an automated control method for controlling the pneumatic system of a blend plant comprises setting an initial position of a pneumatic control valve based on a dry material, transferring the dry material using pneumatic power from a first tank over a transfer line to a second tank, measuring the transfer rate of the dry material, and repeatedly moving the pneumatic control valve a portion of the range of travel of the pneumatic control valve until the transfer rate of the dry material decreases. The method may further comprise delaying an interval of time between the repeatedly moving the pneumatic control valve, wherein the interval of time is determined based on the maximum transfer rate of the dry material and the capacity of the transfer line. The method may further comprise optionally fluidizing the dry material prior to transferring the dry material based on the dry material. The method may further comprise monitoring at least one parameter of the dry material and optionally fluidizing the dry material based at least in part on the at least one parameter. The method may further comprise detecting a plug developing in the transfer line and opening the pneumatic control valve when the plug is detected.

Example 9

In this example, an automated control method for blending dry materials in a bulk plant comprises defining a target weight of a plurality of dry materials to be blended, determining a target first portion weight of a first dry material based on a target weight of the first dry material, conveying a first portion of the first dry material from a first tank to a second tank, determining a target first portion weight of a second dry material based on a target weight of the second dry material, conveying a first portion of the second dry material from a third tank to the second tank, determining a target second portion weight of the first dry material based on the target weight of the first dry material and an actual weight of the first portion of the first dry material transferred to the second tank, conveying a second portion of the first dry material from the first tank to the second tank, determining a target second portion weight of the second dry material based on the target weight of the second bulk material and an actual weight of the first portion of the second dry material transferred to the second tank, conveying a second portion of the second dry material from the third tank to the second tank, determining a target third portion weight of the first dry material based on the target weight of the first dry material and an actual weight of the first and second portions of the first dry material transferred to the second tank, and conveying a third portion of the first dry material from the first tank to the second tank. The method may further comprise determining an estimated line weight of the first dry material in a transfer line between the first tank and the second tank and employing the estimated line weight to measure out the first, second, and third portions of the dry material.

Example 10

In this example, a system for controlling the transfer of dry materials in a blend plant comprises at least one storage tank equipped with a discharge valve, wherein each storage tank contains a dry material, at least one scale tank, at least one transfer line coupled between the at least one storage tank and the at least one scale tank, a gas injection system operably coupled to each storage tank and each transfer line, a vacuum system operably coupled to each scale tank, and an automated control system for controlling each discharge valve and the gas injection system to maximize a transfer rate of the dry materials from the at least one storage tank to the at least one scale tank. The automated control system may control the gas injection system to regulate the amount of gas injected into the at least one storage tank prior to transfer of the dry materials to the at least one scale tank. The gas injection system may further comprise a pneumatic valve controlled by the automated control system to regulate the amount of gas injected into the at least one transfer line during transfer of the dry materials to the at least one scale tank to maximize a transfer rate of the dry materials. The automated control system may estimate the weight of the dry material within the at least one transfer line during transfer of a dry material from the at least one storage tank to the at least one scale tank. The automated control system may determine when to close the discharge valve based on the estimated weight of dry material within the at least one transfer line and the weight of dry material within the scale tank.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. The methods may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each other, but may still be indirectly coupled and in communication with one another. Other examples of changes, substitutions, and alterations are ascertainable by one skilled in the art and could be made without departing from the spirit and scope disclosed herein.

What is claimed is:

1. A method for blending dry material in a plant, comprising:

measuring a transfer rate of the dry material; and automatically modulating based on the transfer rate a quantity of gas injected into the dry material during transfer of the dry material to maximize the transfer rate of the dry material, the gas injected into the dry material providing at least a portion of the motive force to promote transfer of the dry material.

2. The method of claim 1 wherein the plant is a cement blending plant.

3. The method of claim 2 wherein the dry material comprises cement, sand, salt, bentonite, silica flour, or combinations thereof.

4. The method of claim 1 wherein the automatically modulating comprises determining an amount of time to fluidize the dry material prior to transfer and fluidizing the dry material for the amount of time prior to transfer.

5. The method of claim 4 wherein the determining comprises minimizing moisture introduced to the dry material.

6. The method of claim 4 wherein the determining is based on a length of time having past since the dry material was last fluidized.

7. The method of claim 4 wherein the automatically modulating comprises maximizing the transfer rate of the dry material.

8. The method of claim 7 wherein the automatically modulating comprises detecting a developing plug of the dry material during transfer.

9. The method of claim 8 wherein the automatically modulating comprises estimating the weight of the dry material in a transfer line.

10. The method of claim 9 wherein the automatically modulating comprises minimizing dribbling during transfer of the dry material.

11. The method of claim 8 wherein the automatically modulating comprises minimizing dribbling during transfer of the dry material.

12. The method of claim 7 wherein the automatically modulating comprises estimating the weight of the dry material in a transfer line.

13. The method of claim 12 wherein the automatically modulating comprises minimizing dribbling during transfer of the dry material.

14. The method of claim 7 wherein the automatically modulating comprises minimizing dribbling during transfer of the dry material.

15. The method of claim 4 wherein the automatically modulating comprises detecting a developing plug of the dry material during transfer.

16. The method of claim 15 wherein the automatically modulating comprises estimating the weight of the dry material in a transfer line.

17. The method of claim 16 wherein the automatically modulating comprises minimizing dribbling during transfer of the dry material.

18. The method of claim 15 wherein the automatically modulating comprises minimizing dribbling during transfer of the dry material.

19. The method of claim 4 wherein the automatically modulating comprises estimating the weight of the dry material in a transfer line.

20. The method of claim 19 wherein the automatically modulating comprises minimizing dribbling during transfer of the dry material.

21. The method of claim 4 wherein the automatically modulating comprises minimizing dribbling during transfer of the dry material.

22. The method of claim 1 wherein the modulating comprises continually adjusting the quantity of gas injected.

23. The method of claim 1 wherein when a maximum transfer rate of the dry materials obtained, the modulating ceases until the transfer rate falls below a setpoint material transfer rate.

24. The method of claim 1 wherein when a maximum transfer rate of the dry materials obtained, the modulating comprises finely adjusting the quantity of the gas injected.

25. The method of claim 1 wherein the automatically modulating comprises detecting a developing plug of the dry material during transfer.

26. The method of claim 25 wherein the detecting a developing plug comprises measuring an increase in a vacuum pressure and a decrease in a transfer rate of the dry material.

27. The method of claim 25 wherein the automatically modulating comprises eliminating the developing plug.

28. The method of claim 25 wherein the automatically modulating comprises estimating the weight of the dry material in a transfer line.

29. The method of claim 28 wherein the automatically modulating comprises minimizing dribbling during transfer of the dry material.

30. The method of claim 25 wherein the automatically modulating comprises minimizing dribbling during transfer of the dry material.

31. The method of claim 1 wherein the automatically modulating comprises detecting a developing plug of the dry material during transfer.

32. The method of claim 31 wherein the automatically modulating comprises eliminating the developing plug via modulating a quantity of gas injected into the dry material during transfer.

33. The method of claim 31 wherein the automatically modulating comprises estimating the weight of the dry material in a transfer line.

34. The method of claim 33 wherein the automatically modulating comprises minimizing dribbling during transfer of the dry material.

35. The method of claim 31 wherein the automatically modulating comprises minimizing dribbling during transfer of the dry material.

36. The method of claim 1 wherein the automatically modulating comprises estimating the weight of the dry material in a transfer line.

37. The method of claim 36 wherein the estimating comprises averaging a plurality of measured weights of the dry material in the transfer line over time.

38. The method of claim 36 wherein the estimating comprises averaging a measured weight of the dry material in the transfer line with an expected weight of the dry material in the transfer line.

39. The method of claim 36 wherein the automatically modulating comprises minimizing dribbling during transfer of the dry material.

40. The method of claim 1 wherein the automatically modulating comprises estimating the weight of the dry material in a transfer line.

41. The method of claim 40 wherein the automatically modulating comprises minimizing dribbling during transfer of the dry material.

42. The method of claim 1 wherein the automatically modulating comprises minimizing dribbling during transfer of the dry material.

43. The method of claim 42 wherein the minimizing dribbling comprises limiting dribbling to transfer of a final portion of the dry material.

44. The method of claim 1 wherein the automatically modulating comprises minimizing dribbling during transfer of the dry material.

45. The method of claim 1 wherein the transfer of the dry materials is from a first tank to a second tank through a transfer line.

46. The method of claim 45 wherein a time lag occurs between modulating the quantity of gas injected and a corresponding change in the transfer rate.

47. The method of claim 46 wherein the time lag is greater than about 5 seconds.

* * * * *